United States Patent
Hester-Redmond

(10) Patent No.: US 10,542,828 B2
(45) Date of Patent: Jan. 28, 2020

(54) MODULAR WALL ASSEMBLY FOR A COSMETIC FIXTURE SYSTEM

(71) Applicant: Walmart Apollo, LLC, Bentonville, AR (US)

(72) Inventor: Sunshine Rae Hester-Redmond, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/696,846

(22) Filed: Sep. 6, 2017

(65) Prior Publication Data

US 2017/0360220 A1   Dec. 21, 2017

Related U.S. Application Data

(63) Continuation of application No. 14/581,056, filed on Dec. 23, 2014, now Pat. No. 9,782,018.

(Continued)

(51) Int. Cl.
*A47F 1/12* (2006.01)
*A47F 5/08* (2006.01)
(Continued)

(52) U.S. Cl.
CPC ............ *A47F 1/126* (2013.01); *A47F 1/125* (2013.01); *A47F 5/0025* (2013.01); *A47F 5/08* (2013.01);
(Continued)

(58) Field of Classification Search
CPC ...... A47F 5/0018; A47F 5/008; A47F 5/0807; A47F 5/0815; A47F 5/103; A47F 5/101; A47F 5/0025; A47F 1/126; A47F 3/001; A47F 1/125; A47F 5/08; A47B 57/16; A47B 57/40; A47B 57/42; A47B 96/00; A47B 2220/0077; H01R 25/14; H01R 25/16; H02G 1/06; H02G 3/22;
(Continued)

(56) References Cited

U.S. PATENT DOCUMENTS 3,640,389 A   2/1972   Snyder
3,836,936 A   9/1974   Clement
(Continued)

FOREIGN PATENT DOCUMENTS

WO   WO-2014032190 A1 *   3/2014   ............. F21V 21/35

*Primary Examiner* — Theodore V Adamos
(74) *Attorney, Agent, or Firm* — McCarter & English, LLP; David R. Burns

(57) ABSTRACT

Exemplary embodiments of the present disclosure relate to a merchandise display system having a modular wall assembly configured to provide electrical power to one or more shelf assemblies. The wall assembly can include a vertically oriented back panel, a cross bar horizontally and detachably mounted to the back panel, a pair of vertical uprights and a top cap. The pair of vertical uprights can be detachably mounted to the cross bar with each of the vertical uprights having an electrically non-conductive portion and an electrically conductive portion. The electrically conductive portion can be electrically isolated from the cross bar by the electrically non-conductive portion. The top cap can be disposed along an upper edge of the back panel and in electrical contact with electrically conductive portion of each of the vertical uprights.

21 Claims, 30 Drawing Sheets

Related U.S. Application Data

(60) Provisional application No. 61/920,426, filed on Dec. 23, 2013, provisional application No. 61/920,388, filed on Dec. 23, 2013.

(51) Int. Cl.
  *A47F 5/00* (2006.01)
  *H02G 3/38* (2006.01)
  *F21V 33/00* (2006.01)
  *H02G 3/04* (2006.01)
  *F21W 131/301* (2006.01)

(52) U.S. Cl.
  CPC ......... *F21V 33/0012* (2013.01); *H02G 3/388* (2013.01); *F21W 2131/301* (2013.01); *H02G 3/045* (2013.01); *Y10T 29/49117* (2015.01)

(58) Field of Classification Search
  CPC ........ H02G 3/388; H02G 3/045; F21V 21/00; F21V 21/096; F21V 33/0012; F21V 23/06; Y10T 29/49117; F21W 2131/301
  USPC ......... 365/225, 133; 211/26, 26.2, 134, 135, 211/187, 150, 153, 189, 190, 191, 192, 211/193, 206; 178/68.1, 50, 68.3, 481; 439/215
  See application file for complete search history.

(56) References Cited

U.S. PATENT DOCUMENTS

| | | |
|---|---|---|
| 3,894,170 A | 7/1975 | Harmut |
| 4,401,222 A | 8/1983 | Kulikowski et al. |
| 4,973,796 A | 11/1990 | Dougherty et al. |
| 5,348,485 A | 9/1994 | Briechle et al. |
| 5,477,971 A | 12/1995 | Howard |
| 5,509,541 A | 4/1996 | Merl |
| 5,641,081 A | 6/1997 | Merl |
| 5,695,261 A | 12/1997 | Slesinger et al. |
| 6,199,705 B1 | 3/2001 | Portner |
| 6,527,406 B1 | 3/2003 | Slesinger et al. |
| 6,527,565 B1 | 3/2003 | Johns |
| 6,918,499 B2 * | 7/2005 | De Land ............... A47B 96/04 211/103 |
| 7,946,435 B2 | 5/2011 | Clark et al. |
| 7,954,979 B2 | 6/2011 | Sommers et al. |
| 8,967,740 B2 | 3/2015 | Kerner |
| 9,157,678 B2 | 10/2015 | Kerner |
| 9,782,018 B2 * | 10/2017 | Hester-Redmond ...... A47F 5/08 |
| 2004/0055514 A1 | 3/2004 | De Land et al. |
| 2005/0082082 A1 | 4/2005 | Walter et al. |
| 2006/0207778 A1 * | 9/2006 | Walter ................... A47B 96/14 174/19 |
| 2006/0209537 A1 | 9/2006 | Stelmasik et al. |
| 2006/0283822 A1 * | 12/2006 | Jacques ............. A47B 96/1416 211/103 |
| 2011/0215212 A1 | 9/2011 | Keyvanloo |
| 2012/0085718 A1 | 4/2012 | Bergdoll et al. |
| 2012/0230018 A1 | 9/2012 | Wiemer et al. |
| 2013/0094202 A1 | 4/2013 | Wylie |
| 2014/0104826 A1 | 4/2014 | Bergdoll et al. |
| 2014/0349502 A1 | 11/2014 | Meis |
| 2015/0173528 A1 | 6/2015 | Hester-Redmond |
| 2015/0173529 A1 | 6/2015 | Hester-Redmond |
| 2015/0201762 A1 | 7/2015 | Walter |

* cited by examiner

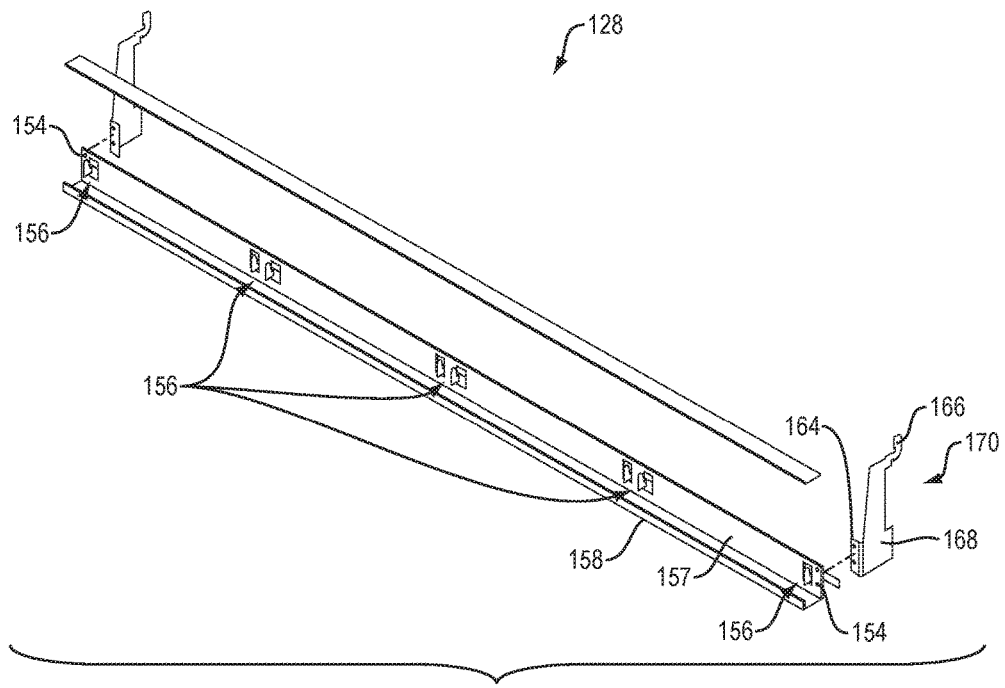
FIG. 7A
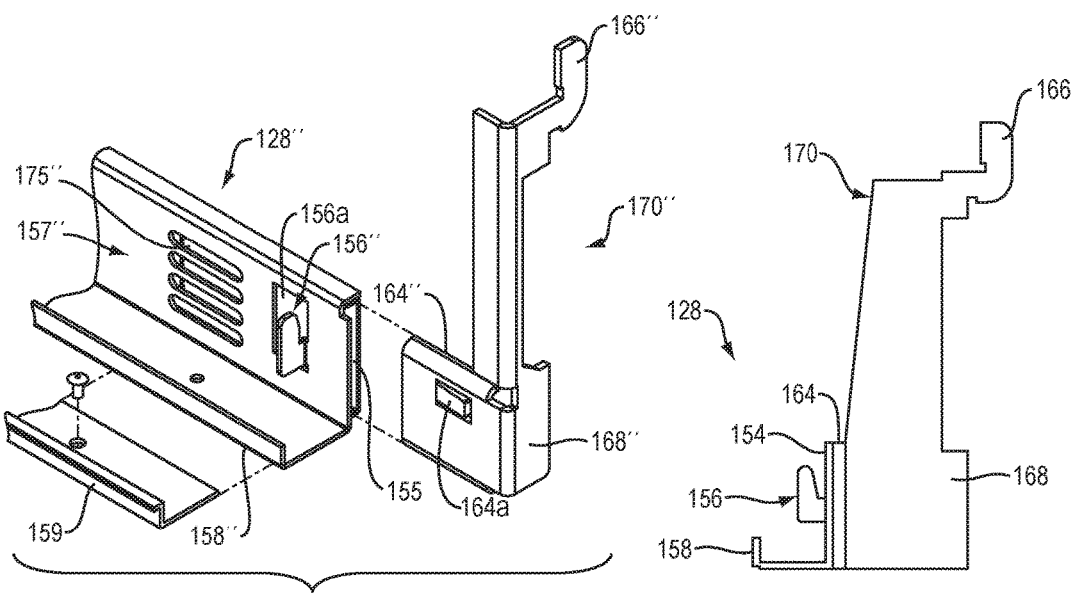
FIG. 7B
FIG. 8

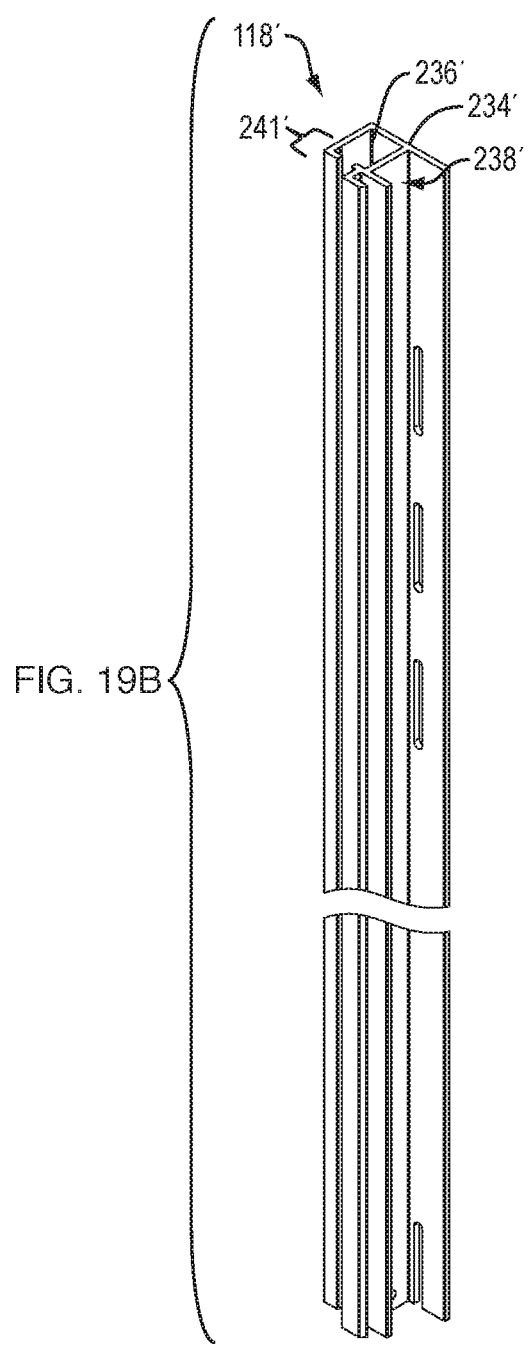

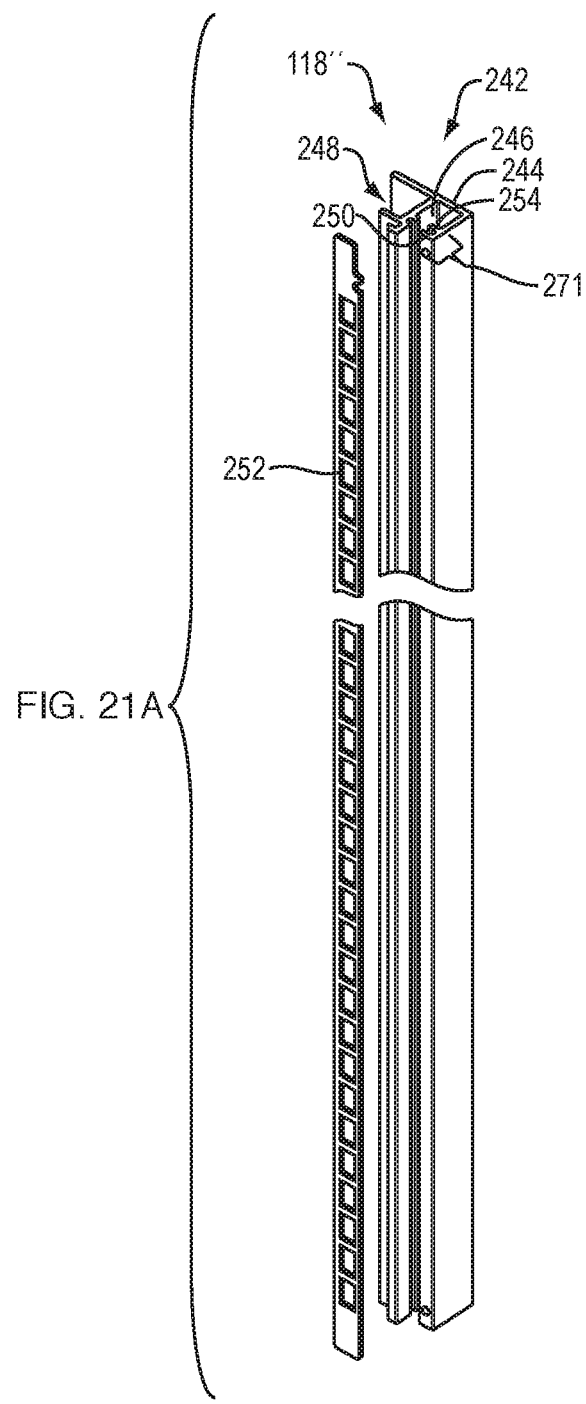

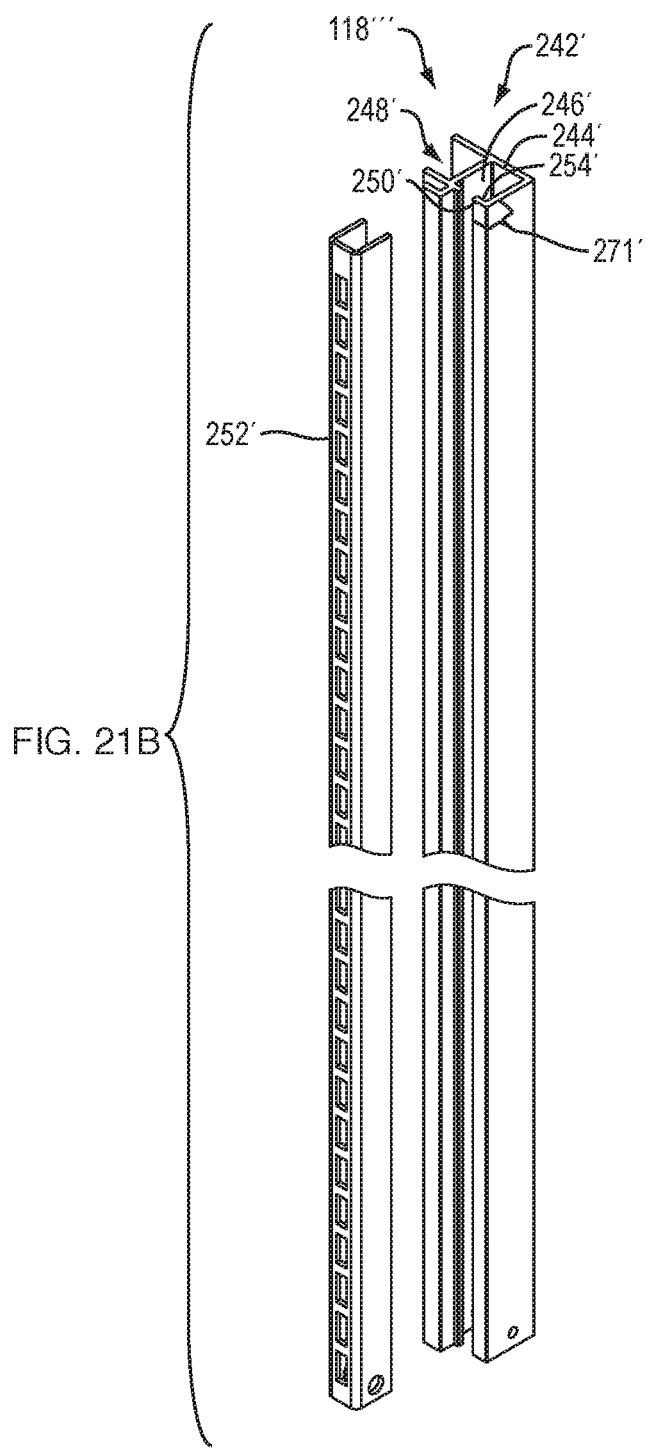

MODULAR WALL ASSEMBLY FOR A COSMETIC FIXTURE SYSTEM

CROSS-REFERENCE TO RELATED APPLICATIONS

This application is a continuation of and claims priority to and benefit of U.S. patent application Ser. No. 14/581,056, filed on Dec. 23, 2014, the disclosure of which is incorporated herein by reference in its entirety. This application also claims priority to and benefit of U.S. Provisional Patent Application No. 61/920,388, filed Dec. 23, 2013, the disclosure of which is incorporated herein by reference in its entirety. This application also claims priority to and benefit of U.S. Provisional Patent Application No. 61/920,426, filed Dec. 23, 2013, the disclosure of which is incorporated herein by reference in its entirety.

FIELD OF INVENTION

Exemplary embodiments of the present disclosure generally relate to modular wall assemblies that can be configured with shelving assemblies to hold or display merchandise in a retail environment.

BACKGROUND

Conventional merchandise display systems are often constructed to accommodate a fixed arrangement of products using product specific wall and shelving solutions. As a result of the limited arrangements and flexibility of conventional merchandise display systems, retail entities may be incapable of adapting or incapable of efficiently adapting to new product packaging or display configurations with their existing hardware/fixture inventor.

SUMMARY

Exemplary embodiments of the present disclosure are related to modular wall assemblies that can be configured to hold or display merchandise in a retail environment. The wall assemblies can receive reconfigurable shelf assemblies to form a merchandise display system that can be reconfigured to change or adapt to display requirements, product requirements, or a combination of display and product requirements. For example, exemplary embodiments of the wall assembly can support modular components that can be assembled to accommodate different product dimensions and/or product packaging to overcome the limitation or disadvantages of conventional merchandise display systems and can provide retail or wholesale entities with a flexibility to reconfigure the merchandise display system to meet their needs.

In an exemplary embodiment, a modular wall assembly can be configured to provide electrical power to a shelf assembly. The wall assembly can include a vertically oriented back panel and a cross bar that can be horizontally and detachably mounted to the back panel. The modular wall assembly can include a pair of vertical uprights detachably mounted to the cross bar with each of the vertical uprights having an electrically non-conductive portion and an electrically conductive portion. The electrically conductive portion of the vertical uprights can be electrically isolated from the cross bar by the electrically non-conductive portion. The wall assembly can further include a top cap disposed along an upper edge of the back panel, which can be placed in electrical contact with electrically conductive portion of each of the vertical uprights.

Some embodiments are directed towards a merchandise display system including a wall assembly and a shelf assembly. The wall assembly can include a vertically oriented back panel, a cross bar that can be horizontally and detachably mounted to the back panel, a pair of vertical uprights that can be detachably mounted to the cross bar. The wall assembly can include a top cap disposed along an upper edge of the back panel and in electrical contact with the pair of vertical uprights to provide electricity. The shelf assembly can include an area to hold merchandise for display. A pair of electrically conductive support arms extends from the shelf assembly to facilitate detachably mounting the shelf assembly to the wall assembly. When the electrically conductive arms are mounted to the vertical uprights, the pair of electrically conductive arms can be in electrical contact with the pair of vertical uprights to receive electricity from one of the vertical uprights. The shelf assembly can include circuitry having a light source and the circuitry can selectively engage the electrically conductive arms to energize the light source.

In some embodiments, each end of the cross bar can have a bracket and the back panel can be configured to receive the bracket at each end of the cross bar to detachably couple the cross bar to the vertical support structure. In some embodiments the cross bar can include a plurality of mating members disposed along a length of the cross bar and the pair of vertical uprights can include openings configured to receive the mating members to detachably couple the vertical upright to the crossbar.

In some embodiments, the electrically non-conductive portion can be formed as a frame and the electrically conductive portion can be formed as an insert supported by the frame. In some embodiments the insert can have an elongate body that extends a length of the frame. The elongate body can include openings distributed along the length. The openings can be configured to receive the electrically conductive arms of shelf assemblies to position the shelf assemblies at different heights. In some embodiments, the frame can include a first channel formed along a longitudinal side edge of the frame and a pair of channels that includes a second channel opposingly spaced from and open towards a third channel.

In some embodiments, the wall assembly can include a power supply mounted to the back panel. The power supply can be electrically coupled to the top cap to provide electricity to the top cap.

In some embodiments, the wall assembly can include a recessed surface of a vertically oriented back panel, configured to be recessed with respect to the vertical support structure. In some embodiments, the wall assembly can include a flushed surface of the vertically oriented back panel, configured to be flush with respect to the vertical support structure. In some embodiments, the cross bar can include a bracket extending outwardly from a recessed surface of the vertically oriented back panel. The bracket can be configured to bridge a gap created by the recessed surface. In some embodiments the cross bar can include a plurality of brackets to attach to a plurality of mounting geometries on the vertically oriented back panel.

Some embodiments are directed to a method of configuring a reconfigurable merchandise display. The method includes securing a cross bar to the back panel and securing two or more vertical uprights to the cross bar. The first vertical uprights can include an electrically non-conductive portion and an electrically conductive portion. The electrically conductive portion can be electrically isolated from the cross bar by the electrically non-conductive portion. The method includes securing a top cap to be in electrical contact between two or more of the vertical uprights and securing a shelf assembly to two or more of the vertical uprights. The shelf assembly can include an area configured to hold merchandise for display, a pair of electrically conductive support arms extending from the shelf assembly, and circuitry. The circuitry can selectively engage the electrically conductive arms. The electricity can flow from the top cap through a first one of the vertical uprights to a first one of the electrically conductive arms to supply the electricity to the circuitry and flow from the circuitry through a second one of the conductive arms and a second one of the vertical uprights back to the top cap.

Any combination or permutation of embodiments is envisioned. Other objects and features will become apparent from the following detailed description considered in conjunction with the accompanying drawings, wherein like reference numerals identify like elements. It is to be understood, however, that the drawings are designed as an illustration only and not as a definition of the limits of the present disclosure.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 7A depicts a front perspective view of an exemplary embodiment of a lower cross bar of a wall assembly.

FIG. 7B depicts a front perspective view of an exemplary embodiment of another lower cross bar of a wall assembly.

FIG. 8 depicts a side view of an exemplary embodiment of a lower cross bar bracket of a wall assembly.

FIG. 19B depicts a front perspective view of an exemplary embodiment of another left upright end assembly of a wall assembly.

FIG. 21A depicts a front perspective view of an exemplary embodiment of a right upright end assembly of a wall assembly.

FIG. 21B depicts a front perspective view of an exemplary embodiment of another right upright end assembly of a wall assembly.

DETAILED DESCRIPTION OF EXEMPLARY EMBODIMENTS

Exemplary embodiments of the present disclosure are generally directed to merchandise display systems that can include modular wall assemblies and reconfigurable shelf assemblies that can be mounted to the wall assemblies. Exemplary embodiments of the wall assemblies can include a vertically support structure having a vertically oriented back panel. One or more cross bars can be horizontally and detachably mounted to the back panel and two or more vertical uprights can be detachably mounted to the cross bars. In exemplary embodiments, the vertical uprights can have an electrically non-conductive portion and an electrically conductive portion. A top cap can disposed along an upper edge of the back panel and can be placed in electrical contact with electrically conductive portion of each of the vertical uprights. Exemplary embodiments of the shelf assembly can include an area configured to hold merchandise for display and a pair of electrically conductive support arms extending from the shelf assembly, which can be utilized to detachably couple the shelf assemblies to the wall assembly. Circuitry can be included in the shelf assembly, which can be configured to be in electrical communication with the conducting portion of at least one of the vertical uprights via the electrically conductive arms.

Exemplary embodiments of the present disclosure overcome the limitations and disadvantages of conventional merchandise display systems, which are often constructed to accommodate a fixed arrangement of products using product specific wall and shelving solutions. While some conventional merchandise display systems provide flexibility for limited arrangement, the components of such systems can be bulky and the process for rearranging the display systems can be cumbersome and time consuming. As a result of the limited arrangements and flexibility of conventional merchandise display systems, retail entities may be incapable of adapting or incapable of efficiently adapting to new product packaging or display configurations with their existing hardware/fixture inventor. To address this issue, some retail entities using conventional merchandise display systems may be required to purchase new packaging specific hardware/fixture solutions (which may not integrate with their existing inventory) to accommodate new product packaging or display configurations; thereby increasing the size and cost of the hardware/fixture inventory maintained by the retail entity. Exemplary embodiments of the present disclosure overcome the limitations and disadvantages of conventional merchandise display systems by supporting modular components that can be assembled to accommodate different product dimensions and/or product packaging and can provide retail or wholesale entities with a flexibility to reconfigure the merchandise display system to meet their needs.

Figure 1A:
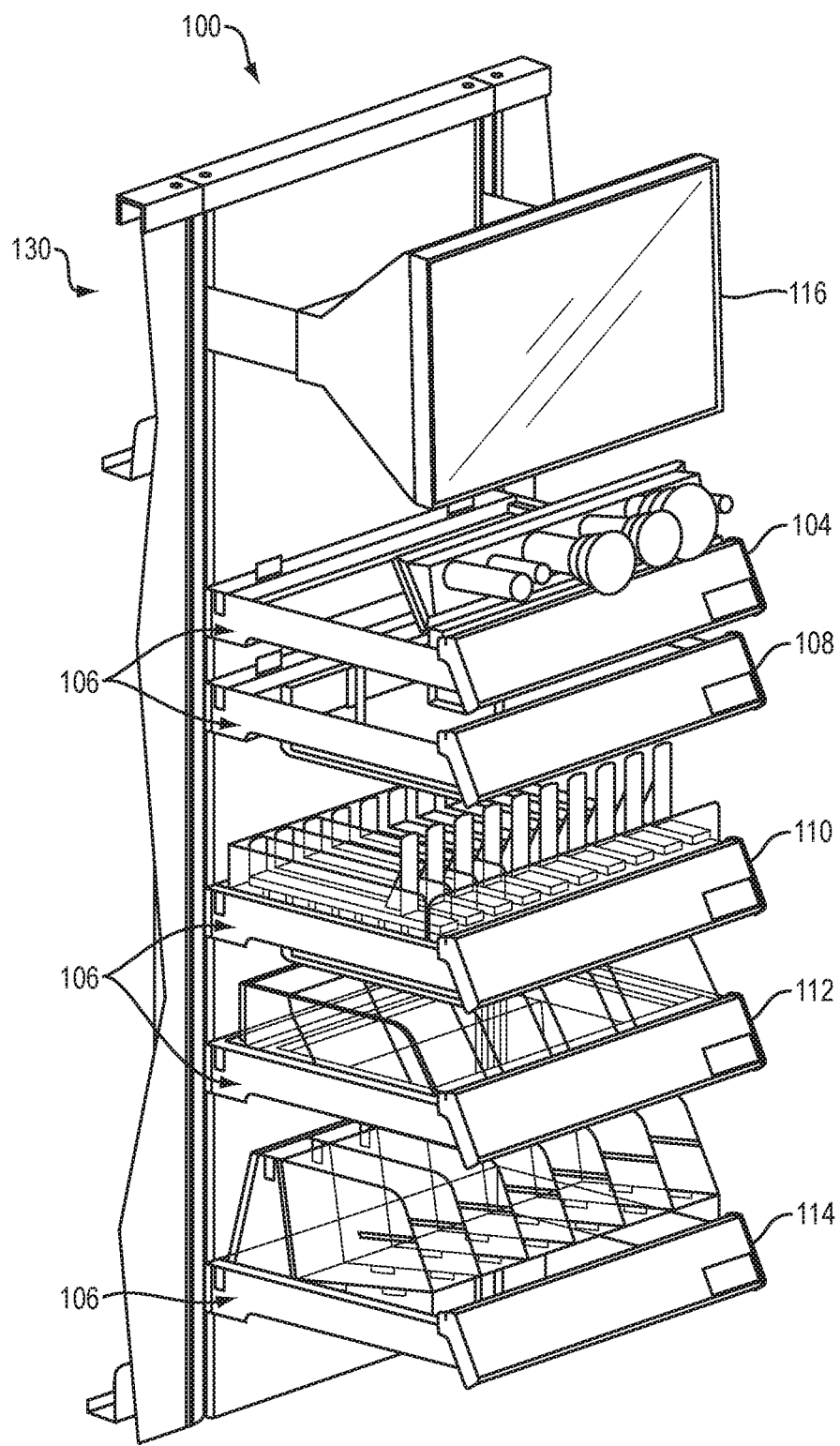
FIGS. 1A and 1B depict exemplary embodiments of a merchandize display wall system.
Figure 1B:
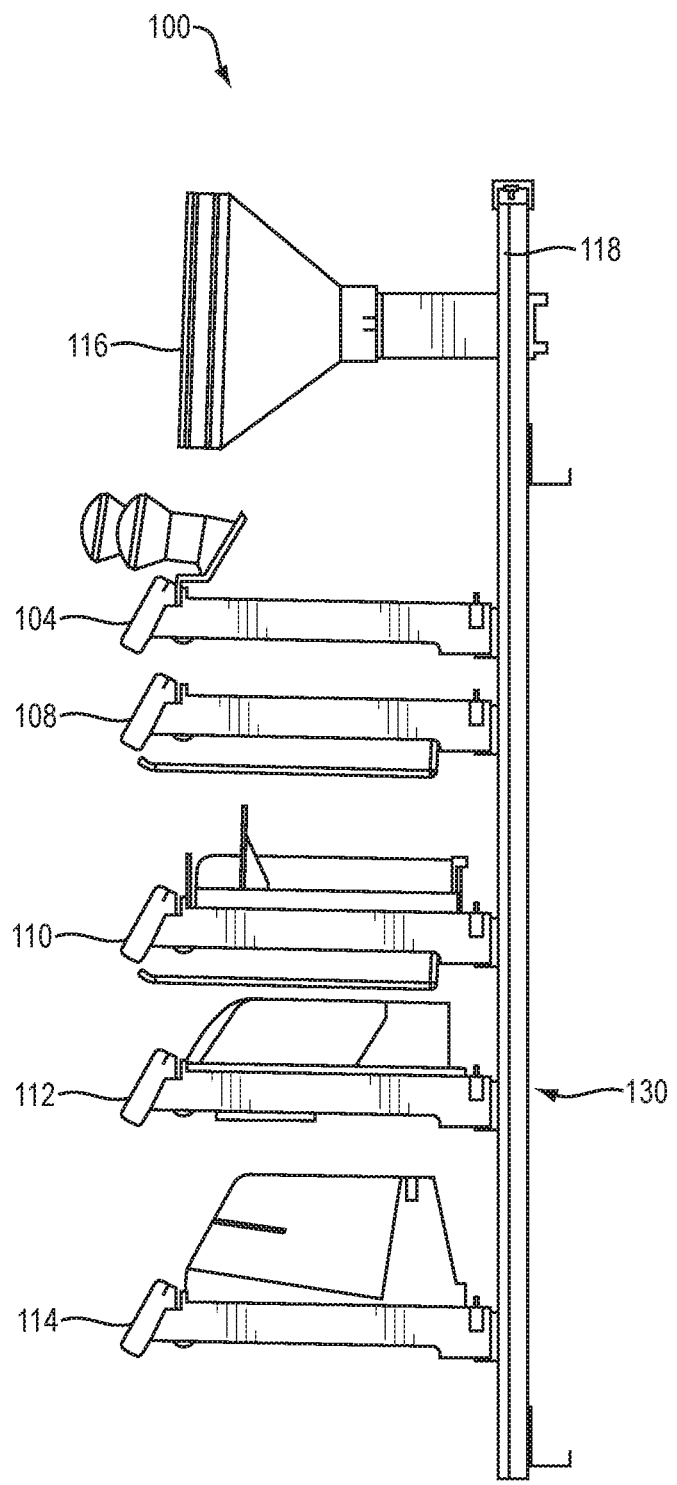

FIGS. 1A and 1B depict exemplary embodiments of reconfigurable shelf assemblies 106 that can be mounted to a wall assembly 130 to form a merchandise display wall system 100. Each of the shelf assemblies 106 can be configured to hold or display retail products in a retail environment. In the present embodiment, the merchandise display wall system 100 includes various configurations of the shelf assemblies 106 including a brush display shelf assembly 104, a peg hook shelf assembly 108, a divider tray shelf assembly 110, a Bon Bon tray shelf assembly 112, and a trim tray shelf assembly 114. In exemplary embodiments, one or more of the reconfigurable shelf assemblies 106 can be mounted to the vertical support structure 132 in one or more configurations to form the merchandise display wall system 100. For example, one or more of the shelf assemblies 104, 106, 108, 110, 112, and 114 can be mounted to the wall assembly 130. Exemplary embodiments of the shelf assemblies 106 are described in more detail herein and in U.S. Patent Application Ser. No. 61/920,426 entitled "Modular Shelf Assembly for a Cosmetic Fixture System" filed on Dec. 23, 2013, which is incorporated herein by reference in its entirety and for all purposes.

The shelf assemblies 106 can be selectively coupled to the electrically conductive vertical uprights 118 of the wall assembly 130. For example, the shelf assemblies 106 can include a pair of electrically conductive support arms extending from the shelf assemblies 106 to attach the shelf assemblies 106 to the wall assembly 130. The wall assembly 130 can be configured to provide electricity to the shelf assemblies 106 via the vertical uprights 118 to power circuitry associated with the shelf assemblies 106. For example, the shelf assemblies 106 can include circuitry including a light source, which can illuminate one or more areas around the shelf assemblies 106. When the electrically conductive arms engage the wall assembly 130, electricity flows from the vertical uprights 118 through the electrically conductive arms 343 (FIG. 34) and to the circuitry to energize the light source.

In exemplary embodiments, the merchandise display wall system 100 can have a reconfigurable arrangement allowing for one or more of the shelf assemblies 106 to be reset, removed or rearranged, either as a group or independent of one another. Reconfiguration may be used to adapt to new product displays or to adapt to retail facility resets.

In some embodiments the shelf assemblies 106 can be adjustably spaced along the wall assembly 130. For example, the shelf assemblies 106 may be attached to the wall assembly 130 with uniform spacing between the shelf assemblies 106 or may be attached to the wall assembly 130 with different or variable spacing between the shelf assemblies 106.

In some embodiments, the merchandise display wall system 100 can include one or more light boxes 116. The one or more light boxes 116 may be placed towards a top of the merchandise display wall system 100 or between one or more of the shelf assemblies 106. The one or more light boxes 116 may have a fixed light characteristic or may have variable characteristics. The light characteristics may depend on a location at which the merchandise display wall system 100 is disposed in the facility (e.g., a retail store), a time of day, particular products contained/supported by the shelf assemblies 106 of the merchandise display wall system 100, or any combination thereof. In some embodiments, the light box 116 may be configured to produce varying or changing colors or intensities of light.

Figure 2:
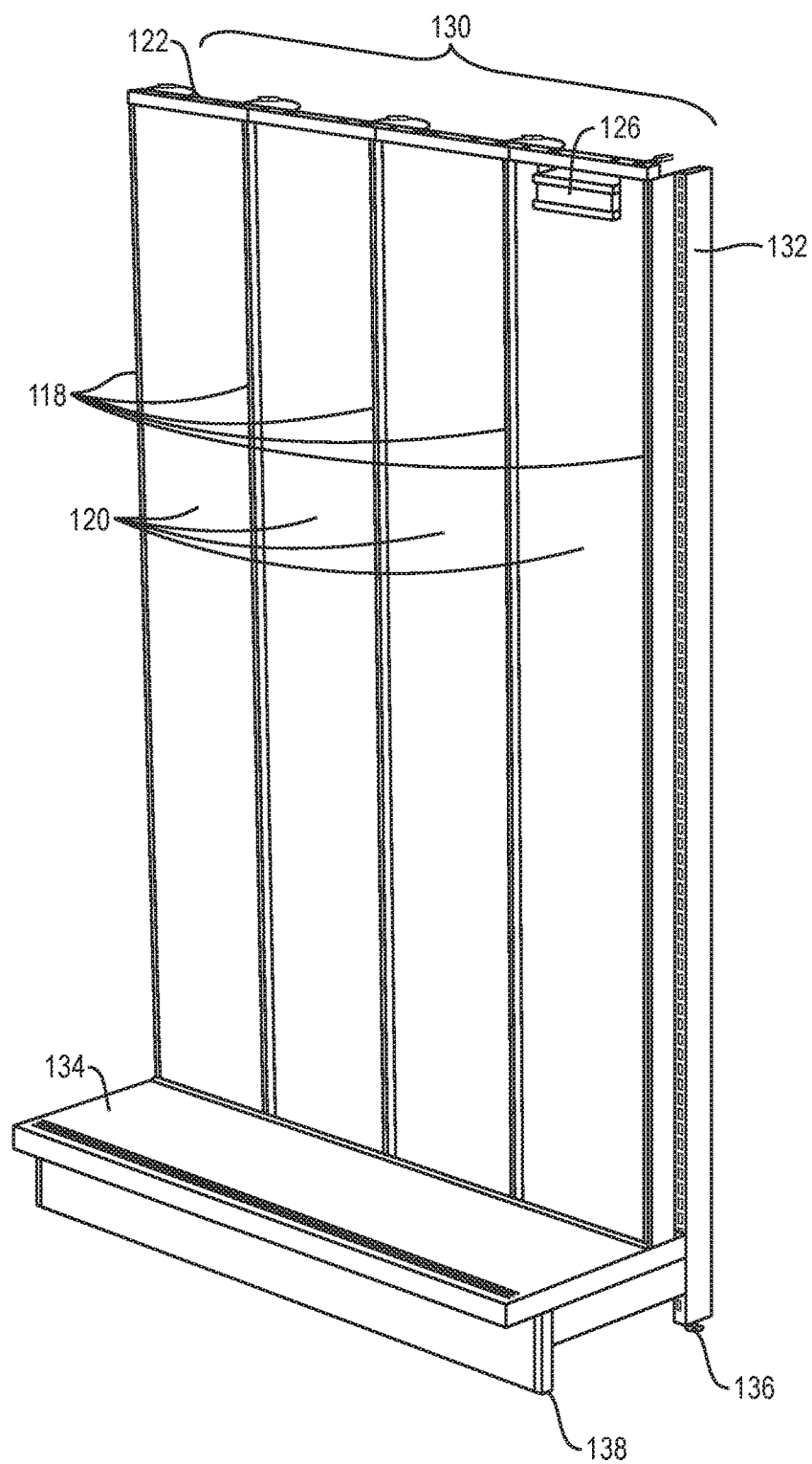
FIG. 2 depicts a front perspective view of an exemplary embodiment of a wall assembly of a merchandise display wall system.

FIG. 2 depicts a front perspective view of an exemplary embodiment of a wall assembly 130 of the merchandise display wall system 100 shown in FIGS. 1A and 1B. In the present embodiment, the wall assembly 130, includes a vertical support structure 132, a ledge 134, a front base support structure 138, and a rear base support structure 136. The wall assembly 130 can include the vertical uprights 118, front panels 120, top caps 122, and a power supply 126. In exemplary embodiments, one or more of the vertical uprights 118, the front panels 120, the top caps 122, or the power supply 126 can be operatively mounted to the vertical support structure 132.

In some embodiments, the wall assembly 130 can have a reconfigurable arrangement allowing for the spacing between the vertical uprights 118 and the corresponding front panels 120 to have varying horizontal dimensions. In some embodiments, the wall assembly 130 can have a reconfigurable arrangement allowing for one or more of the front panels 120 to be reset, removed or rearranged, either as a group or independent of one another. Reconfiguration can be used to adapt to new product displays or to adapt to retail facility resets.

Figure 3:
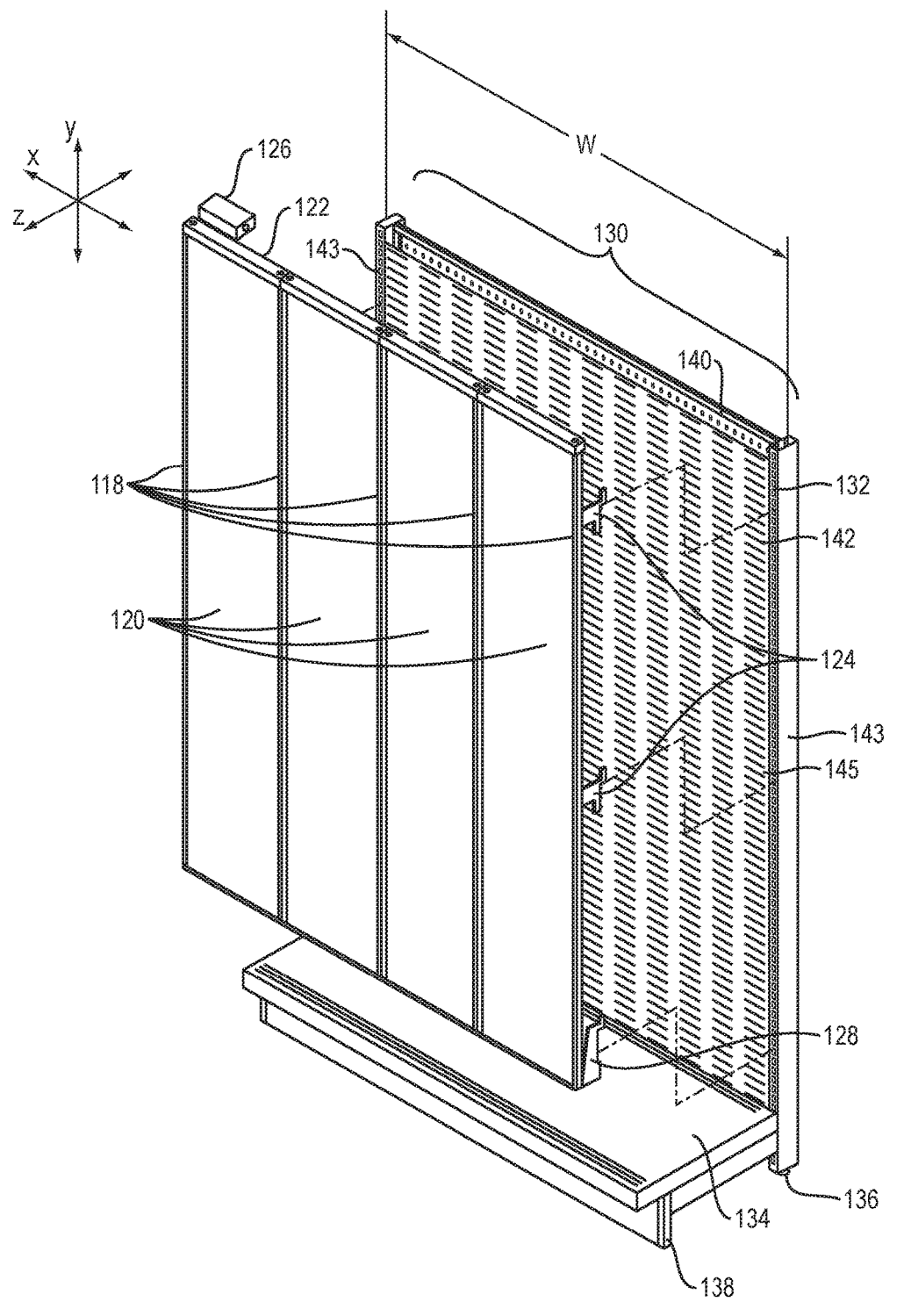
FIG. 3 depicts a partially exploded view of an exemplary embodiment of a wall assembly.

FIG. 3 depicts a partially exploded view of an exemplary embodiment of a wall assembly 130. Referring to FIG. 3, the wall assembly 130 can include upper cross bars 124, a lower cross bar 128, the vertical uprights 118, the front panels 120, the top caps 122, the power supply 126, and the vertical support structure 132. In exemplary embodiments, the vertical support structure can include a ledge 134, a rear base support structure 136, a front base support structure 138, a top support structure 140, and a back panel 142. As shown in FIG. 3, the top structure 140 can extend along an x-axis across width W of the vertical support structure 132 to define a top terminal end of the vertical support structure 132. The vertical support structure 132 can extend downward from the top support structure 140 along a y-axis to the ledge 134 to define the back panel 142 of the vertical support structure 132, which has side edges 143. In exemplary embodiments, a surface 145 of the back panel 142 can include openings (e.g. slots, hole, etc.) distributed on the back panel. The openings can be configured to facilitate mounting of the cross bars 124 and 128 to the vertical support structure 132. The surface 145 of the back panel 142 extends between the side edges 143 of vertical support structure 132 along the x-axis and between the top support structure 140 and the ledge 134 along the y-axis such that a perimeter of the back panel 142 is defined by the top support structure 140, side edges 143, and the ledge 134.

The upper cross bars 124 and/or the lower cross bar 128 can be attached to the back panel 142 of the wall assembly 130. For example, the upper cross bars 124 and the lower cross bar 128 can be configured to facilitate different configurations of the vertical support structure to support different arrangements of vertical upright 118 and front panel 120 arrangements. The upper cross bars 124 or the lower cross bar 128 can be operatively attached to assembly single vertical support structure or can be operatively attached to multiple vertical support structures.

The vertical uprights 118 can be detachably coupled to the upper cross bar 124 or the lower cross bar 128. The vertical uprights 118 can be positioned parallel to one another extending from the ledge 134 to the top support structure 140. The front panels 120 can be detachably coupled to the vertical uprights 118 and can be formed from a styrene, polymer, or the like.

Figure 4:
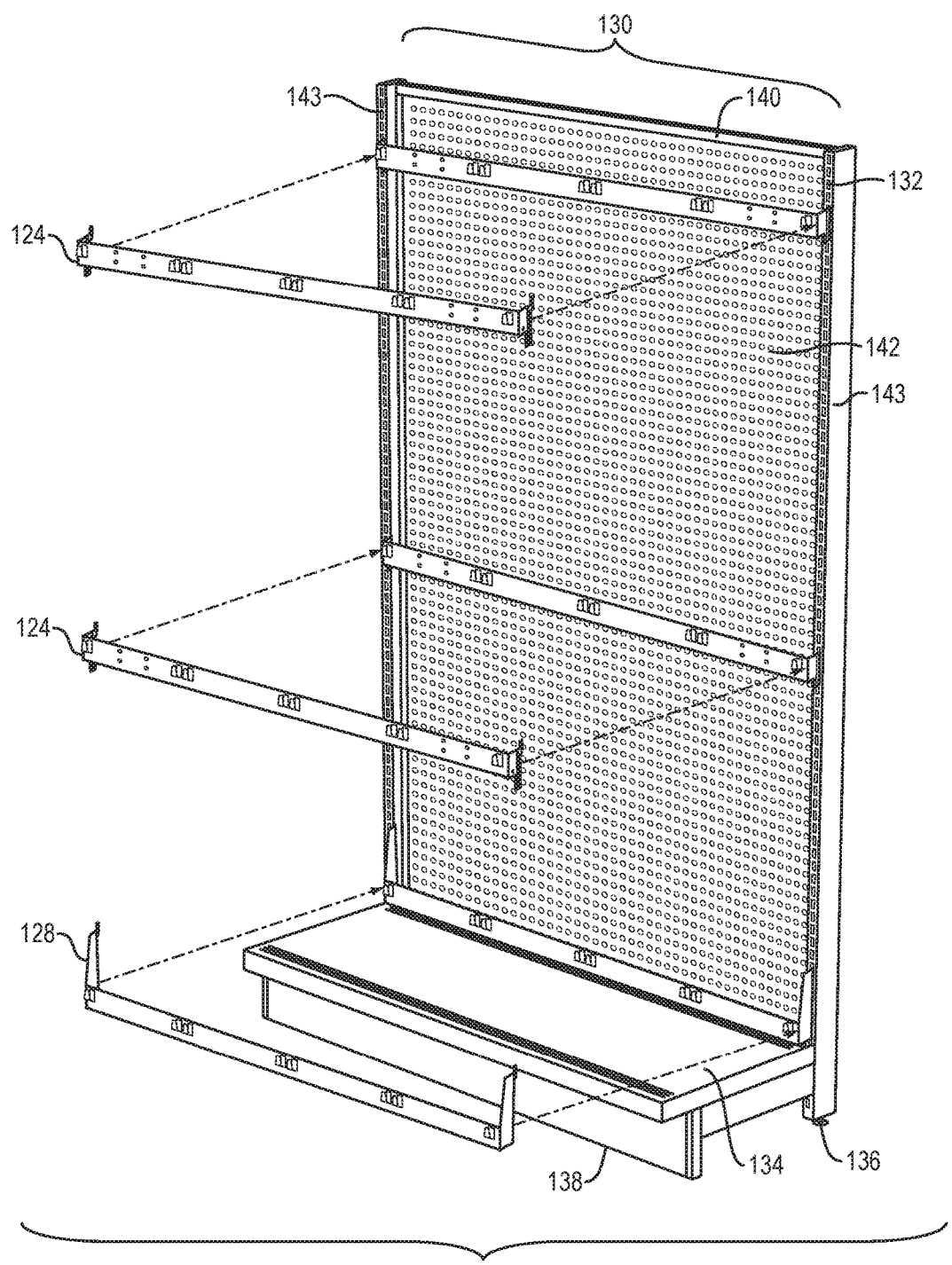
FIG. 4 depicts a front perspective view of an exemplary embodiment of a vertical support structure and a cross bar to form a wall assembly.

FIG. 4 depicts a front perspective view of an exemplary embodiment of a vertical support structure 132 and a cross bar to form a portion of the wall assembly 130. As shown in FIG. 4, the upper cross bars 124 and the lower cross bar 128 can be attached to the vertical support structure 132. In some embodiments, the cross bars 124 and 128 can be operatively coupled to the openings formed in the back panel 142. The cross bars 124, 128 can be mounted in a horizontal arrangement parallel to the top support structure 140.

In some embodiments the cross bars 124, 128 can be adjustably spaced along the wall assembly 130. For example, the upper cross bars 124 or the lower cross bar 128 can be attached to the vertical support structure 132 with uniform spacing between the cross bars 124, 128 or can be attached to the vertical support structure 132 with different or variable spacing between the cross bars 124, 128. The cross bars 124, 128 can be configured to extend from the first side of the support structure 132 to the second side of the support structure 132. In some embodiments the cross bar can extend across a segment of the back panel 142.

Figure 5A:
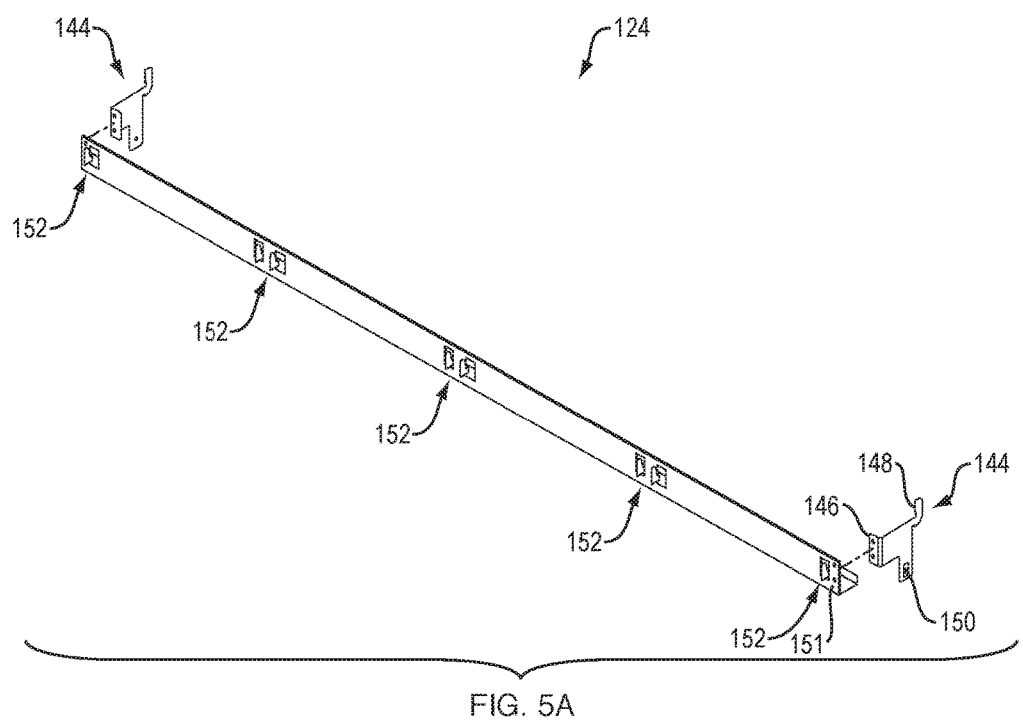
FIG. 5A depicts a front perspective view of an exemplary embodiment of an upper cross bar of a wall assembly.

FIG. 5A, depicts a front perspective view of an exemplary embodiment of the upper cross bar 124. Referring to FIG. 5A, the cross bar 124 can include one or more mating members 152 distributed along the front surface of the cross bar 124 to facilitate attachment of one or more vertical uprights 118 to the cross bar 124 to form the wall assembly 130. For example, the mating members 152 can have an interlocking structure and can be configured to support the vertical uprights to facilitate different configurations of the merchandise display wall system 100 such as a variation in a front panel width, a variation in shelf assembly width, or the like.

Figure 6:
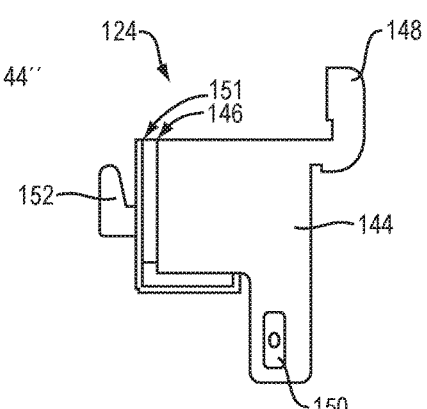
FIG. 6 depicts a side view of an exemplary embodiment of an upper cross bar bracket of a wall assembly.

Still referring to FIG. 5A, the cross bar 124, can include brackets 144 disposed on ends of a back surface of the cross bar 124. The cross bar 124, can include brackets 144 disposed on a back surface of the cross bar 124. The bracket 144 can be operatively coupled to the cross bar 124 by a first mating surface 151 as shown in FIG. 6, located on the cross bar 124 and a second mating surface 146 located on the brackets 144. The brackets 144 can detachably couple the cross bar 124 to the vertical support structure 132. For example, in some embodiments, the brackets 144 can be configured to operatively couple the cross bar 124 to the side edges 143 of the vertical support structure 132, can be configured to operatively couple the cross bar 124 to the back panel 142 inwardly of the side edges 143, or can be configured to operatively couple the cross bar to either the side edges 143 or the back panel 142 inwardly of the side edges 143.

Figure 5B:
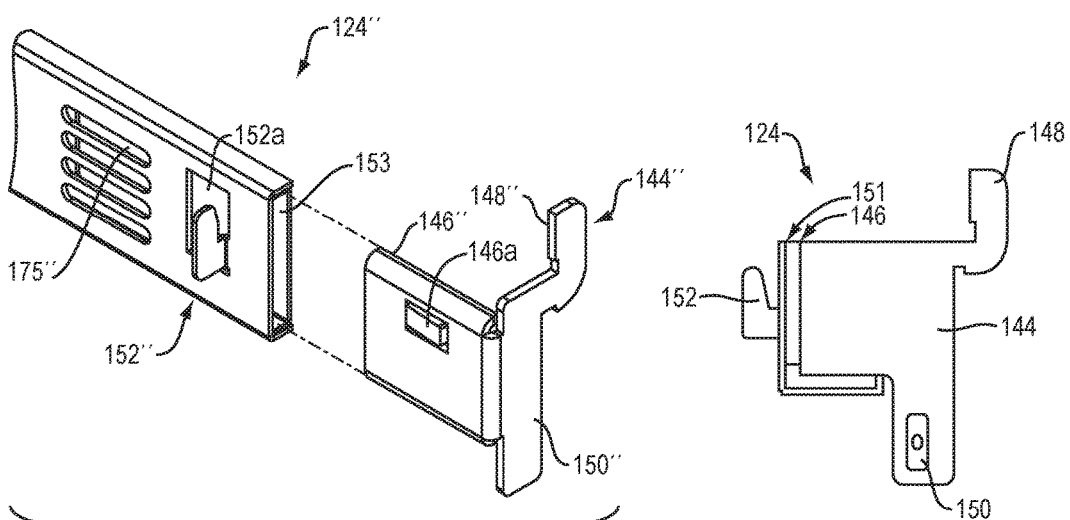
FIG. 5B depicts a front perspective view of an exemplary embodiment of another upper cross bar of a wall assembly.

FIG. 5B, depicts a front perspective view of an exemplary embodiment of another upper cross bar 124". Referring to FIG. 5B, the cross bar 124" can include one or more mating members 152" distributed along the front surface of the cross bar 124" to facilitate attachment of one or more vertical uprights 118 to the cross bar 124" to form the wall assembly 130. For example, the mating members 152' can have an interlocking structure and can be configured to support the vertical uprights to facilitate different configurations of the merchandise display wall system 100 such as a variation in a front panel width, a variation in shelf assembly width, or the like.

Still referring to FIG. 5B, the cross bar 124" can include brackets 144" at least partially inserted in open ends of the cross bar 124". The bracket 144" can be operatively coupled to the cross bar 124" by inserting mating member 146" into an open end of a hollow interior 153 of the cross bar 124". In accordance with various embodiments, the bracket 144" can be retained within the hollow interior 153 by inserting mating member 146" far enough into the hollow interior 153 to align depressible locking member 146a with locking aperture 152a, thereby releasing depressible locking member 146a from a depressed state, causing the depressible locking member 146a to project through aperture 152a and into locking engagement with the cross bar 124". The brackets 144' can detachably couple the cross bar 124" to the vertical support structure 132. For example, in some embodiments, the brackets 144" can be configured to operatively couple the cross bar 124" to the side edges 143 of the vertical support structure 132, can be configured to operatively couple the cross bar 124" to the back panel 142 inwardly of the side edges 143, or can be configured to operatively couple the cross bar to either the side edges 143 or the back panel 142 inwardly of the side edges 143.

Still further referring to FIG. 5B, the cross bar 124" can include alignment channels 175" formed in the cross bar 124" for receiving pegs 177, 177' of spacer brackets 182, 184 (described with greater detail with reference to FIGS. 12 and 13 below), where a channel width of the alignment channels 175" can generally correspond to a diameter of the pegs 177, 177' formed in the cross bar 124" so that the pegs 177, 177' can be received by the cross bar 124" through the channels 175" to facilitate mounting the cross bar 124" the spacer brackets 182, 184.

FIG. 6 depicts a side view of an exemplary embodiment of the cross bar 124 and bracket 144 in an assembled form. As shown in FIG. 6, the bracket 144 can have a hook 148 extending upward from the rear portion of the bracket 144, and a first mating member 150 extending downward from the underside of the bracket 144 and a second mating member 146 extending forward from the front surface of the bracket 144 to form a hook extending from the front surface of the cross bar. The hook 148 extending from the rear portion of the bracket 144 can be used to couple the bracket to the wall assembly 130. The mating member 150 can be configured to couple together multiple cross bars.

FIG. 7A, depicts a front perspective view of an exemplary embodiment of a lower cross bar 128 of the wall assembly 130. Referring to FIG. 7A, the cross bar 128 can include one or more mating members 156 distributed along the front surface 157 of the cross bar 128 to facilitate attachment of one or more vertical uprights to the cross bar 128 to form the merchandise display wall system 130. For example, the mating members 156 can be configured to support the vertical uprights 118 to facilitate different configurations of the merchandise display wall system 130 such as a variation in front panel width or a variation in shelf assembly width.

Still referring to FIG. 7A, the cross bar 128, can include brackets 170 disposed on a back surface of the cross bar 128. The bracket 170 can be operatively coupled to the cross bar 128 by a first mating surface 154 as shown in FIG. 8, located on the cross bar 128 and a second mating surface 164 located on the brackets 170. The brackets 170 can detachably couple the cross bar to the wall assembly 130 using hook 166. The lower cross bar 128 can include a lip 158 extending forward from the front surface of the cross bar 128. The lip 158 can extend longitudinally across the cross bar 128 or can extend across partial segments of the cross bar 128.

FIG. 7B, depicts a front perspective view of an exemplary embodiment of a lower cross bar 128" of the wall assembly 130. Referring to FIG. 7B, the cross bar 128" can include one or more mating members 156' distributed along the front surface 157" of the cross bar 128" to facilitate attachment of one or more vertical uprights to the cross bar 128" to form the merchandise display wall system 130. For example, the mating members 156" can be configured to support the vertical uprights 118 to facilitate different configurations of the merchandise display wall system 130 such as a variation in front panel width or a variation in shelf assembly width.

Still referring to FIG. 7B, the cross bar 128", can include brackets 170" at least partially inserted in open ends of the cross bar 128". The bracket 170" can be operatively coupled to the cross bar 128" by inserting mating member 164" into an open end of a hollow interior 155 of the cross bar 128".

In accordance with various embodiments, the bracket 170" can be retained within the hollow interior 155 by inserting mating member 164" far enough into the hollow interior 155 to align depressible locking member 164a with locking aperture 156a, thereby releasing depressible locking member 164a from a depressed state, causing the depressible locking member 164a to project through aperture 156a and into locking engagement with the cross bar 124". The brackets 170" can detachably couple the cross bar to the wall assembly 130 using hook 166".

The lower cross bar 128" can include a lip 158" extending forward from the front surface of the cross bar 128". The lip 158" can extend longitudinally across the cross bar 128" or can extend across partial segments of the cross bar 128". In accordance with various embodiments, a non-conductive lip liner 159 can be disposed over an upper surface of the lip 158" for isolating the lip 158" from one or more electrically conductive power track inserts of the vertical uprights when the merchandise display wall system 130, 130' is assembled.

Still further referring to FIG. 7B, the cross bar 128" can include alignment channels 175" formed in the cross bar 128" for receiving pegs 177, 177' of spacer brackets 182, 184 (described with greater detail with reference to FIGS. 12 and 13 below), where a channel width of the alignment channels 175" can generally correspond to a diameter of the pegs 177, 177' formed in the cross bar 128' so that the pegs 177, 177' can be received by the cross bar 128" through the channels 175" to facilitate mounting the cross bar 124" the spacer brackets 182, 184.

FIG. 8 depicts a side view of an exemplary embodiment of the assembled lower cross bar bracket 170. As shown in FIG. 7A, the lower cross bar bracket 170 can have a hook 166 extending from the rear portion of the lower cross bar bracket 170, and a support footing 168 extending rearwardly along the bottom side of the bracket from the front rear surface of the lower cross bar bracket 170. The hook 166 extending from the rear upper portion of the bracket can be used to couple the bracket 170 to the wall assembly 130. The support footing 168 can be configured to stabilize the cross bar assemblies 124 along the base of the wall assembly 130. The lower lip 158 can extend forward from the first mating surface 154. The first mating surface 154 of the cross bar 128 can be coupled to the second mating surface 164 of the lower cross bar bracket 170.

Figure 9:
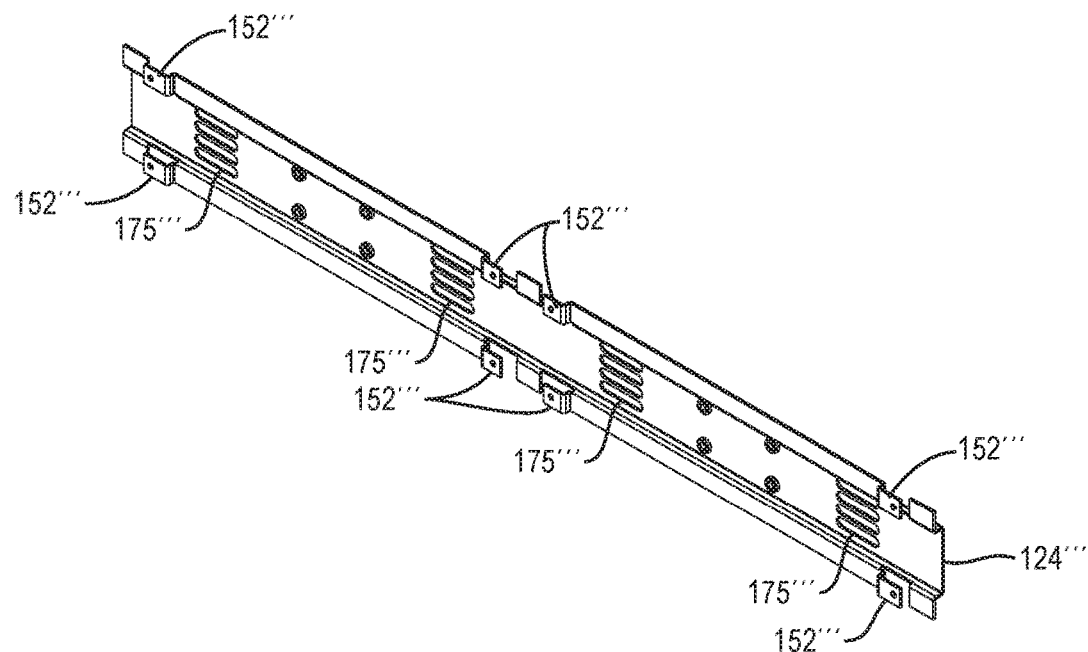
FIG. 9 depicts a front perspective view of an exemplary embodiment of still another upper cross bar of a wall assembly.

FIG. 9 depicts a front perspective view of an exemplary embodiment of another upper cross bar 124'''. Referring to FIG. 9, the cross bar 124''' can include one or more mating members 152''' distributed along the front surface of the cross bar 124" to facilitate attachment of one or more vertical uprights to the cross bar 124" to form the wall assembly 130'. For example, the mating members 152''' can have an interlocking structure and can be configured to support the vertical uprights to facilitate different configurations of the merchandise display wall system 100 such as a variation in a front panel width, a variation in shelf assembly width, or the like.

Mating members 152''' can, in accordance with the present embodiments, include one or more mating tabs having holes thereon for attachment to, for example, mating holes 366 of vertical uprights 118' via fastener (e.g., screws, bolts, and/or rivets).

Still referring to FIG. 9, the cross bar 124''' can include alignment channels 175''' formed in the cross bar 124''' for receiving pegs 177, 177' of spacer brackets 182, 184 (described with greater detail with reference to FIGS. 12 and 13 below), where a channel width of the alignment channels 175''' can generally correspond to a diameter of the pegs 177, 177' formed in the cross bar 124''' so that the pegs 177, 177' can be received by the cross bar 124''' through the channels 175''' to facilitate mounting the cross bar 124''' the spacer brackets 182, 184.

Figure 10:
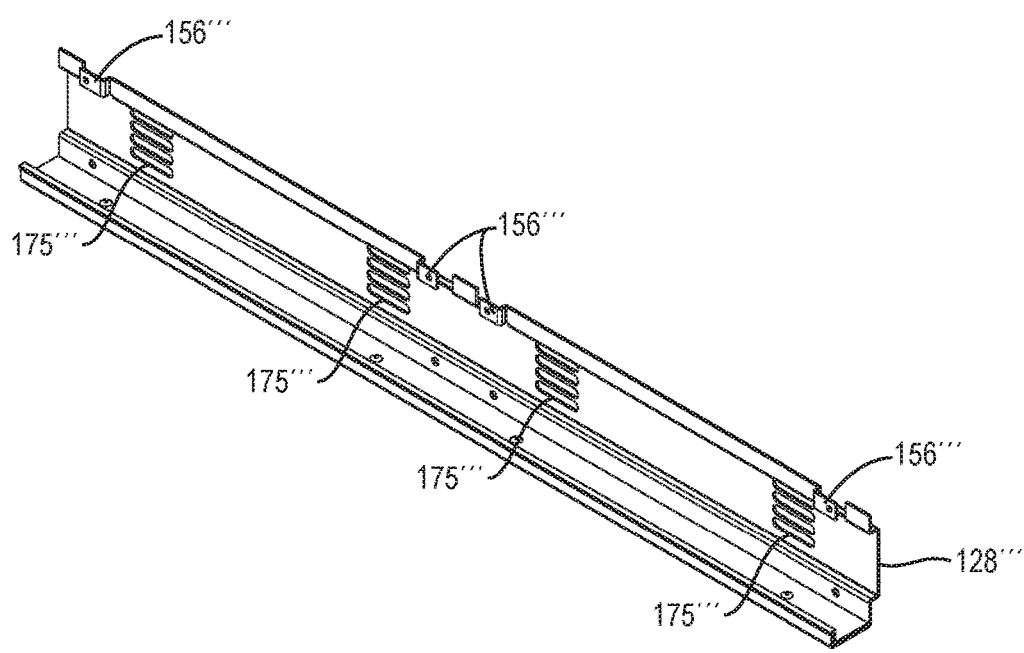
FIG. 10 depicts a front perspective view of an exemplary embodiment of still another lower cross bar of a wall assembly.

FIG. 10 depicts a front perspective view of an exemplary embodiment of a lower cross bar 128''' of the wall assembly 130'. Referring to FIG. 7B, the cross bar 128''' can include one or more mating members 156''' distributed along the front surface of the cross bar 128''' to facilitate attachment of one or more vertical uprights to the cross bar 128''' to form the merchandise display wall system 130'. For example, the mating members 156''' can be configured to support the vertical uprights to facilitate different configurations of the merchandise display wall system 130' such as a variation in front panel width or a variation in shelf assembly width. The lower cross bar 128''' can include a lip extending forward from the front surface of the cross bar 128''. The lip can extend longitudinally across the cross bar 128''' or can extend across partial segments of the cross bar 128'''.

Mating members 156''' can, in accordance with the present embodiments, include one or more mating tabs having holes thereon for attachment to, for example, mating holes 366 of vertical uprights 118' via fastener (e.g., screws, bolts, and/or rivets).

Still referring to FIG. 10, the cross bar 128''' can include alignment channels 175''' formed in the cross bar 128''' for receiving pegs 177, 177' of spacer brackets 182, 184 (described with greater detail with reference to FIGS. 12 and 13 below), where a channel width of the alignment channels 175''' can generally correspond to a diameter of the pegs 177, 177' formed in the cross bar 128''' so that the pegs 177, 177' can be received by the cross bar 128''' through the channels 175''' to facilitate mounting the cross bar 128''' the spacer brackets 182, 184.

Figure 11:
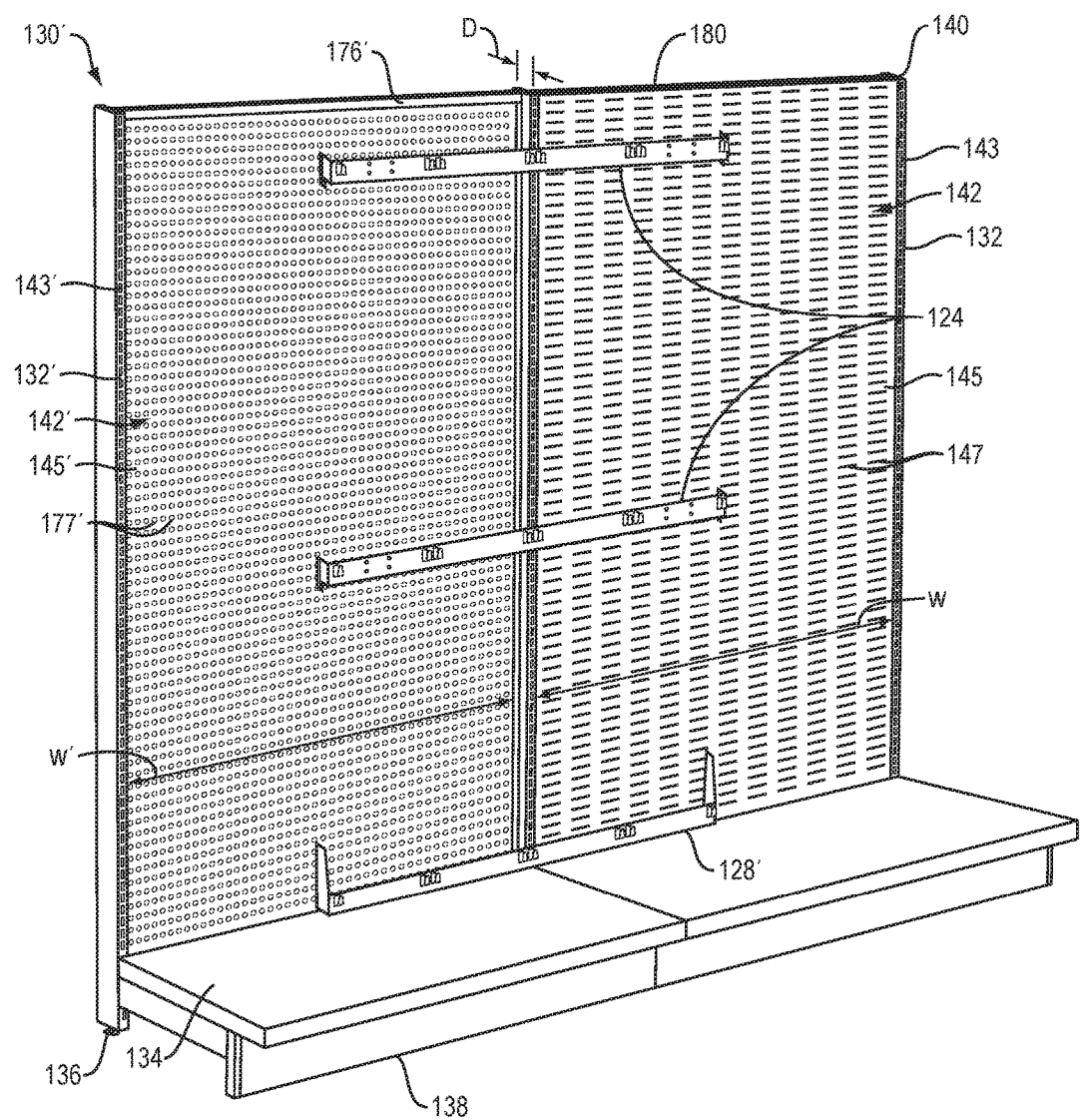
FIG. 11 depicts a front perspective view of an exemplary embodiment of a vertical support structures and a universal cross bar assembly to form a composite wall assembly.

FIG. 11 depicts cross bars 124' and 128' operatively coupling the vertical support structure 132 to a vertical support structure 132'. As shown in FIG. 11, the vertical support structures 132 and 132' can have different mounting configurations for receiving the cross bars 124' and 128'. In exemplary embodiments, the vertical support structures 132 and 132' can be operatively coupled via the cross bars 124' and 128' to form a portion of a composite wall assembly 130' of a merchandise display wall system.

The vertical support structure 132' can generally have a similar structure as the vertical support structure 132. For example, the vertical support structure 132' can include the horizontally extending ledge 134 and a vertically oriented back panel 142' that generally extends perpendicularly from the ledge 134. A perimeter of the back panel 142' can be defined by the ledge 134, a horizontally extending top support structure 140' extending along a width W' of the back panel 142', and side edges 143' extending vertically between the ledge 134 and the top support structure 140'. The back panel 142' can be recessed with respect to the side edges 143' such that the side edges 143 protrude beyond a surface 145 of the back panel 142 by a distance D. As shown in FIG. 11, the surface 145 of the back panel 142' can have openings in the form of circular holes 147' while the surface 145 of the back panel 142 can be flush with the side edges 143 and can include horizontally extending elongate slots 147.

Figure 12:
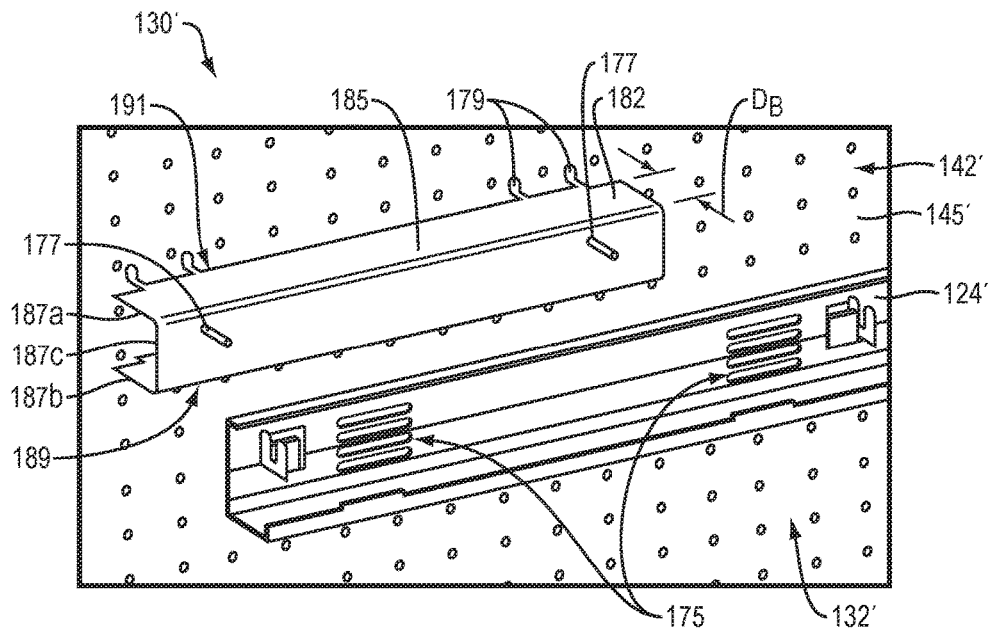
FIG. 12 depicts a front perspective view of an exemplary embodiment of a cross bar attachment arrangement of a wall assembly.
Figure 13:
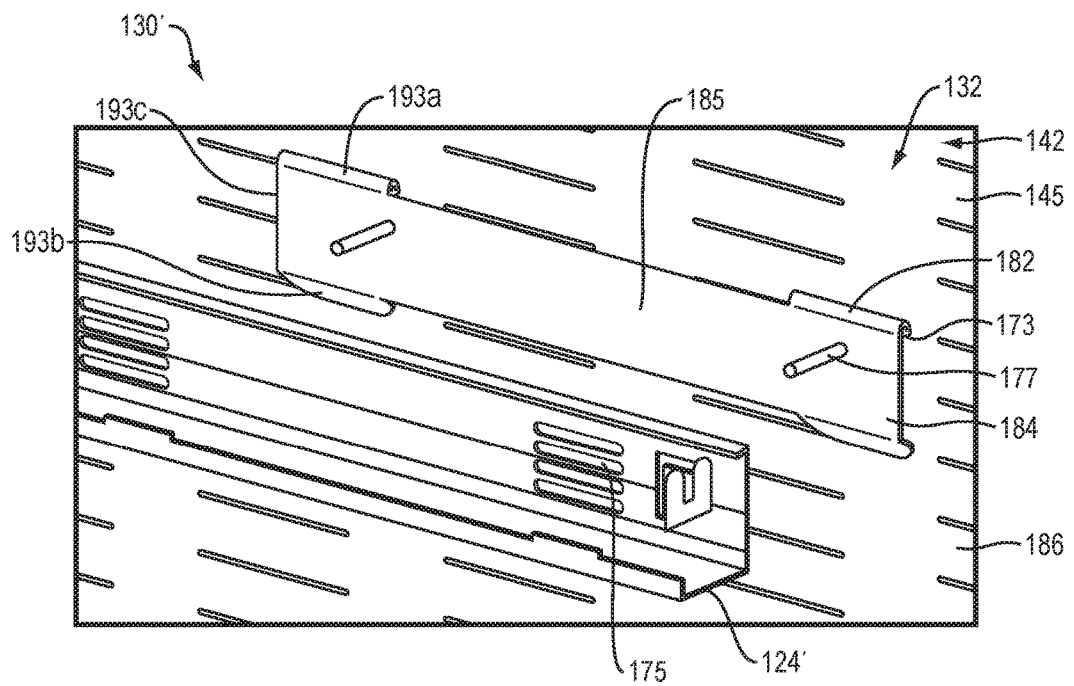
FIG. 13 depicts a front perspective view of an exemplary embodiment of another cross bar attachment arrangement of a wall assembly.

The cross bars 124' and 128' can have a similar structure as the cross bars 124 and 128 except that the cross bars 124' and 128' can include sets of alignment channels 183' distributed along a length of the cross bars 124' and 128' to facilitate attachment of the cross bars 124' and 128' to the back panels 142 and 142' as described in more detail herein with respect to FIGS. 12 and 13. Embodiments of the vertical uprights (e.g., as shown for example, in FIGS. 1A, 1B, and 12-19) can be operatively coupled to the cross bars 124' and 128' via the mating members 152 and 156, respectively.

When the vertical support structures 132 and 132' are disposed adjacent to one another in a side-by-side relationship, the sides 143 and 143' can be positioned to be generally flush with each other in a plane defined by the surface 145 of the back panel 142. As such, the surface 145' of the back panel 142' can be recessed or set back and parallel with respect to the back panel 142 (or the plane defined by the back panel 142). The surfaces 145 and 145' of the back panels 142 and 142', respectively, can be configured to receive different brackets or spacers to facilitate attachment of the cross bars 124' and 128' to the surfaces 145 and 145', which have different mounting configurations. The brackets or spacers can be configured to facilitate attachment of the cross bars 124' and 128' to the surfaces 145 and 145' so that the cross bars 124' and 128' are configured to be substantially parallel to the back panels 142 and 142' when the cross bars 124' and 128 are operatively coupled to the back panels 142 and 142' via the brackets or spacers. Exemplary embodiments of attachment configurations of the cross bars 124' and 128' are depicted in FIGS. 12 and 13.

FIG. 12 depicts a front perspective view of an exemplary embodiment of a cross bar attachment arrangement to the vertical support structure 132' of the wall assembly 130'. As shown in FIG. 12, the cross bar 124' can be operatively mounted to the surface 145' of the back panel 142' via a spacer bracket 182. In exemplary embodiments, the bracket 182 can have an elongate body 185 formed by sides 187a, 187b, and 187c. The sides 187a and 187b can be configured to extend generally parallel to each other. The side 187c can extend perpendicularly between the sides 187a and 187b and can extend between a distal end 189 of the sides 187' and 187b. The sides 187a and 187b can have free ends that terminate on a proximal end of the bracket 182. In some embodiments, the sides 187a, 187b, and 187c can form a rectangular structure having an open side opposite the side 187c. A distance $D_B$ between the proximal end 191 and the distal end 189 can correspond to the distance D that the back panel 142' is recessed with respect to the side edges 143' or the back panel 142' such that a face of the side 187c resides substantially in the plane defined by the back panel 142 and the face of the side 187c is generally flush with the surface 145 of the back panel 142 when the bracket 182 is mounted to the back panel 142'.

The free ends of the sides 187a and 187b can include mating members in the form of cylindrical posts or pegs 179 that extend from the from the free ends at the proximal end 191 of the bracket 182 away from the distal end 189 and parallel to the sides 187a and 187b. The pegs 179 can have a diameter that generally corresponds to a diameter of the circular holes 147' formed in the back panel 142' so that the pegs 179 can be received through the holes to facilitate mounting the bracket 182 to the back panel 142'. In some embodiments, the pegs 179 can have an exterior thread configured to receive a nut to secure the pegs 179 to the back panel 142'.

The face of the side 187c can include cylindrical posts or pegs 177 extending outwardly therefrom and away from the proximal end. The pegs 177 can extend generally parallel to the sides 187a and 187b. The pegs 177 can have a diameter that generally corresponds to a channel width of alignment channels 175 formed in the cross bars 124' and 128' so that the pegs 177 can be received by the cross bars 124' and 128' through the channels 175 to facilitate mounting the cross bars 124' and 128' to the bracket 182. The channel width of the alignment channels 175 can be measured perpendicularly to the lengths of the cross bars 124' and 128'. In some embodiments, the pegs 177 can have an exterior thread configured to receive a nut to secure the cross bars 124' and 128' to the back panel 142'.

The cross bar 124' can be detachably coupled to the back panel 142' having the peg board configuration formed by the openings 147 in the back panel 142'. The bracket 182 can detachably couple to the back panel 142'. The bracket 182 and the cross bar 124' can be reconfigured together or independently of one another to accommodate product reconfigurations or merchandise resets. The bracket 182 can be used to configure a cross bar to be adjustably mounted across a vertical support structures having varying configurations as described herein.

FIG. 13 depicts a front perspective view of an exemplary embodiment of a cross bar attachment arrangement the vertical support structure 132 of the wall assembly 130'. As shown in FIG. 13, the cross bar 124' can be operatively mounted to the surface 145 of the back panel 142 via a spacer bracket 184. In exemplary embodiments, the bracket 184 can have an elongate body 185' formed by sides 193a, 193b, and 193c. The sides 193a and 193b can be configured to be a rolled edge. The side 193c can extend perpendicularly between the sides 193a and 193b.

The rolled edge of the sides 193a and 193b can include mating members in the form of lips or fastening edges 173 that extend from the free ends of the side 193a and 193b. The fastening edges 173 can have a geometry that generally corresponds to a geometry of the elongated slots 147 formed in the back panel 142 so that the fastening edges 173 can be received through the slots to facilitate mounting the bracket 184 to the back panel 142.

The face of the side 193c can include cylindrical posts or pegs extending outwardly therefrom and away from the proximal end. The pegs 177' can extend generally parallel to the sides 193a and 193b. The pegs 177' can have a diameter that generally corresponds to a channel width of the alignment channels 175' formed in the cross bars 124' and 128' so that the pegs 177' can be received by the cross bars 124' and 128' through the channels 175' to facilitate mounting the cross bars 124' and 128' to the bracket 184. The channel width of the alignment channels can be measured perpendicularly to the lengths of the cross bars 124' and 128'. In some embodiments, the pegs 177' can have an exterior thread configured to receive a nut to secure the cross bars 124' and 128' to the back panel 142.

The cross bar 124' can be detachably coupled to the back panel 142 having an elongated slot configuration formed by the openings 147 in the back panel 142. The bracket 184 can detachably couple to the back panel 142. The bracket 184 and the cross bar 124' can be reconfigured together or independently of one another to accommodate product reconfigurations or merchandise resets. The bracket 184 can be used to configure a cross bar to be adjustably mounted across a vertical support structures having varying configurations as described herein.

Figure 14:
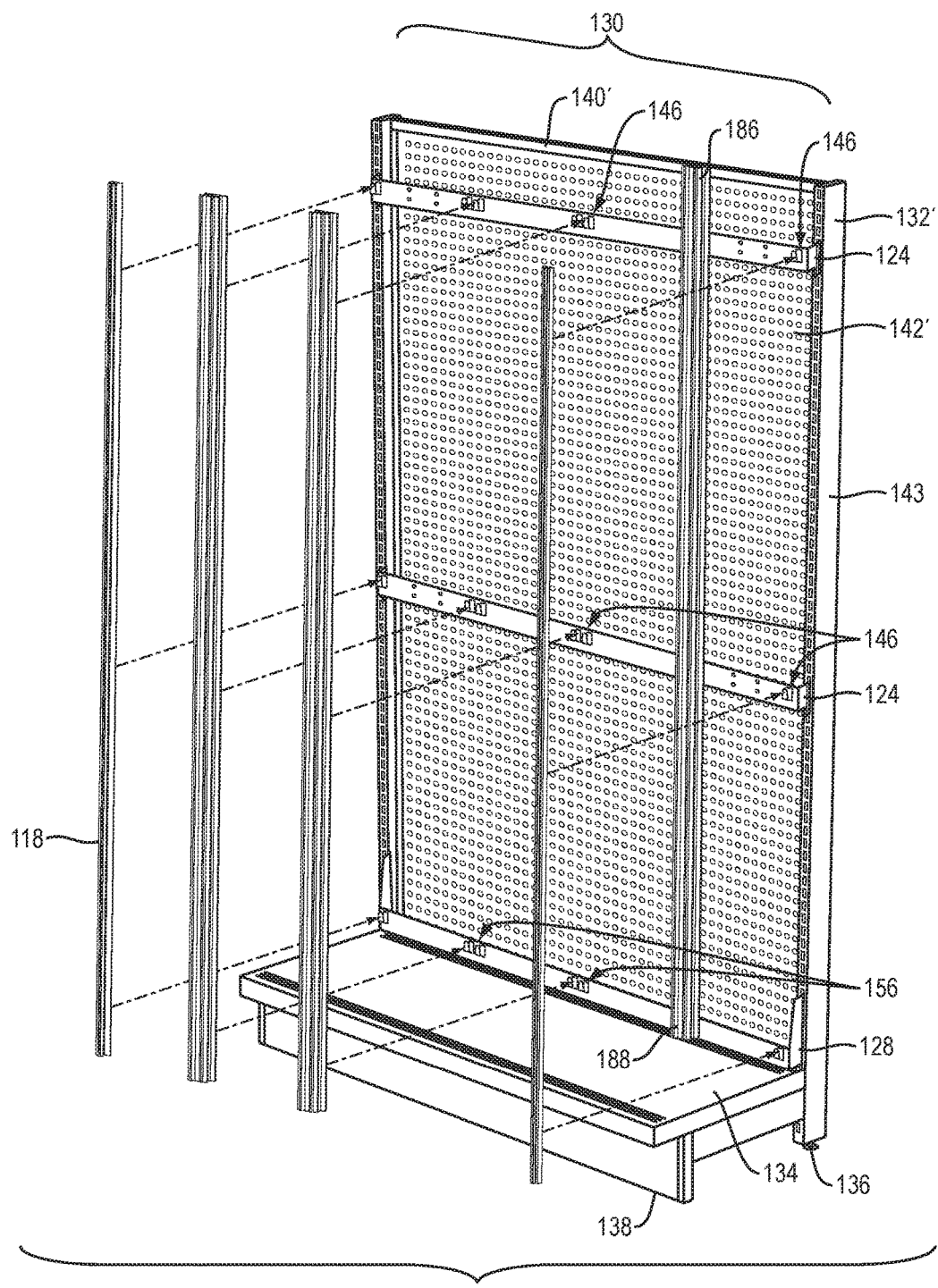
FIG. 14 depicts a front perspective view illustrating an attachment of exemplary vertical uprights to a vertical support structure via cross bar assemblies in accordance with exemplary embodiments of the present disclosure.

FIG. 14 depicts the vertical uprights 118 being attached to cross bars 124, 128 that have been mounted to the vertical support structure 132'. As shown in FIG. 14, the upper cross bar 124 and the lower cross bar 128 can be attached to the sides 143' of the back panel 142' via brackets (e.g., brackets 144 and 170). The mating members 146 and 156 positioned on the front surface of the upper cross bar 124 and the lower cross bar 128 respectively, can receive the vertical uprights 118 to selectively retain the vertical uprights 118 to the cross bars 124 and 128.

In some embodiments, the upper cross bars 124 and the lower cross bar 128 can be configured to facilitate different arrangements of reconfigurable wall assemblies to support different arrangements of the vertical uprights 118 and front panels 120 (FIG. 21). The vertical uprights 118 can be detachably coupled to the upper cross bar 124 and the lower cross bar 128. The vertical uprights 118 can be positioned parallel to one another extending from the ledge 134 of the vertical support structure 132' to the top support structure 140' of the vertical support structure 132. The vertical uprights 118 can have a reconfigurable arrangement allowing for one or more of the vertical uprights 118 to be reset, removed or rearranged, either as a group or independent of one another. Reconfiguration can be used to adapt to new product displays or to adapt to retail facility resets.

In some embodiments the vertical uprights 118 can be adjustably spaced along the cross bar 124, 128. For example, the vertical uprights 118 can be attached to the cross bar 124, 128 with uniform spacing between the vertical uprights or can be attached to the cross bars 124, 128 with different or variable spacing between the vertical uprights 118.

Figure 15:
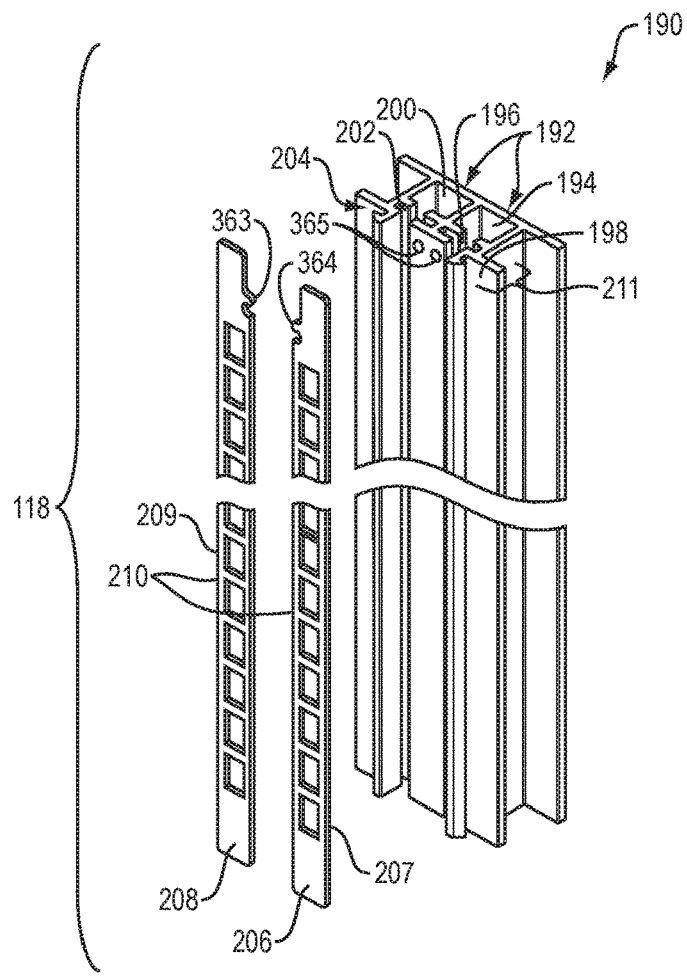
FIG. 15 depicts a front perspective view of an exemplary embodiment of a vertical track upright of a wall assembly.
Figure 16:
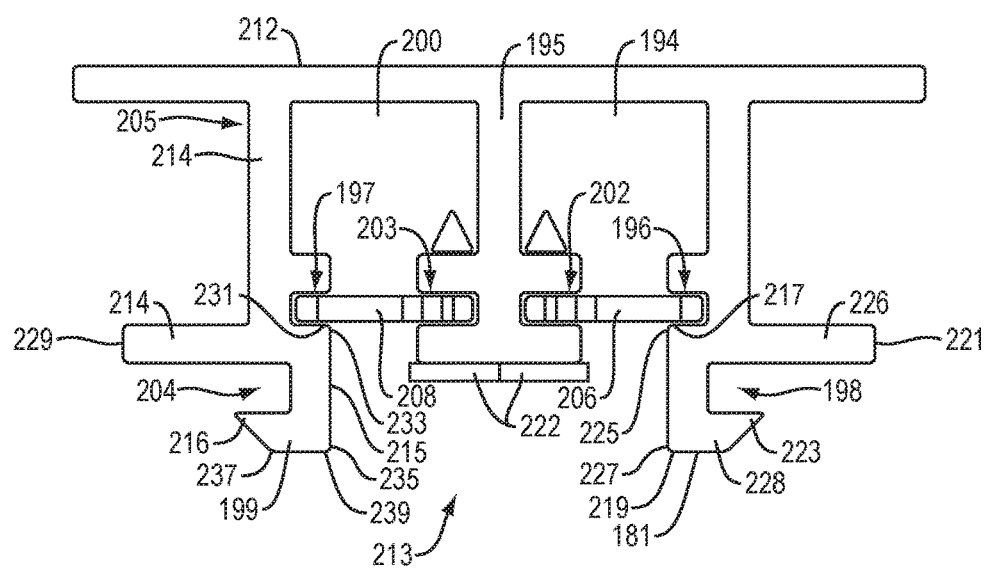
FIG. 16 depicts a cross-sectional view of an exemplary embodiment of a vertical upright of a wall assembly.

FIG. 15 depicts an exploded front perspective view of an exemplary embodiment of one of the vertical uprights 118. FIG. 16 is an assembled cross-sectional view of the vertical upright 118 shown in FIG. 15. The vertical upright 118 can include a frame portion 190 and a power track insert portions 206 and 208. As shown in FIG. 15, the frame portion 190 can have an elongated body having a generally planar rear surface portion 192 configured to mount flush with cross bars (e.g., cross bars 124, 124', 124'', 124''', 128, 128', 128'', 128''') and a multi-channeled front portion 211. The power track insert portions 206 and 208 can have generally planar elongate bodies 207 and 209, respectively. The bodies 207 and 209 can each have openings 210 formed therein, which can be distributed along a length of the bodies 207 and 209. In exemplary embodiments, the frame portion 190 can be formed from an electrically insulating or electrically non-conductive material, such as a polymer (e.g., plastic), and the power track insert portions 206 and 208 can each be formed from an electrical conductive material, such as metal.

Referring to FIGS. 15 and 16, the multi-channeled front portion 211 of the frame portion 190 can have a first pair of channels including a channel 194 and a channel 200, a second pair of channels including a channel 196 and a channel 202, a third pair of channels including a channel 197 and a channel 203, and a fourth pair of channels including a channel 198 and a channel 204. The first through fourth pairs of channels can be formed by arms 181, 195, 199, which generally extend perpendicularly outward from the planar rear surface 192 at an interface between a first end 205 of the arms 181, 195, 199 and the planar rear surface 192. A second end 213 of the arms 181, 195, 199 can include contours that form the first through fourth pairs of channels.

The channels 194 and 200 that form the first pair of channels can be formed between the planar rear surface 192 and the arms 181 and 199. For example, the arms 181 and 195 and the rear planar surface 192 can form the channel 194 and the arms 195 and 199 and the rear planar surface 192 can form the channel 200. As depicted in FIGS. 15 and 16, the channels 194 and 200 can be U-shaped channels that open outwardly away from the planar rear surface 192 towards the second end 213 and can receive a portion of shelf assemblies as described in more detail herein.

The channels 196 and 202 that form the second pair of channels can be formed between the arms 181 and 195 within the channel 194. The channels 196 and 202 can be spaced away from the rear planar surface 192 and can be perpendicular to the channel 194. As depicted in FIGS. 15 and 16, the channel 196 can be formed by the arm 181 and the channel 202 can be formed by the arm 195. The channels 196 and 202 can be opposingly spaced U-shaped channels that open towards each other. In exemplary embodiments, as depicted in FIG. 16, the channels 196 and 202 can be configured to receive the power track insert portion 206 such that the channels 196 and 202 retain the power track insert portion 206 in the multi-channel front portion 211 in parallel relation to the rear planar surface 192.

The channels 197 and 203 that form the third pair of channels can be formed between the arms 195 and 199 within the channel 200. The channels 197 and 203 can be spaced away from the rear planar surface 192 and can be perpendicular to the channel 200. As depicted in FIGS. 15 and 16, the channel 197 can be formed by the arm 199 and the channel 203 can be formed by the arm 195. The channels 197 and 203 can be opposingly spaced U-shaped channels that open towards each other. In exemplary embodiments, as depicted in FIG. 16, the channels 197 and 203 can be configured to receive the power track insert portion 208 such that the channels 197 and 203 retain the power track insert portion 208 in the multi-channel front portion 211 in parallel relation to the rear planar surface 192 and in a plane that includes the power track insert 206.

The channels 198 and 204 that form the fourth pair of channels can be formed by the arms 181 and 199, respectively, and can be distanced further away from the rear planar surface than the second and third pairs of channels such that the power track insert portions 206 and 208 can be recessed with respect to the channels 198 and 204 when the power track insert portions 206 and 208 are inserted into the second and third pairs of channels, respectively. The channels 198 and 204 can be opposingly spaced J-shaped channels that open away from each other and in parallel with the channels 196 and 202 of the second pair of channels, with the channels 197 and 203 of the second pair of channels, and with the rear planar surface 192. The channel 198 can be configured to receive and selectively retain a side edge of a first front panel and the channel 204 can be configured to receive and selectively retain a side edge of a second front panel to hold the first and second front panels in a common plane with respect to the vertical upright 118.

The J-shape of the channel 198 can be formed by wall portion 226, 227, and 228. The wall portion 226 can be formed by the arm 181 and can have a terminal end 221 and connecting end 217. The wall portion 226 can be spaced away from and extend parallel to the rear planar surface 192. The wall portion 227 is formed by the arm 181 and extends perpendicularly to and away from the rear planar surface 192 from the connecting end 217 of the wall portion 226 to a connecting end 219 of the wall portion 228, which is formed by the arm 181 and extends from the connecting end 219 to a terminal end 223 in parallel to the rear planar surface 192 and the wall portion 226, and in a common direction as the wall portion 226. The wall portion 228 has a length that is less than the length of the wall portion 226.

The J-shape of the channel 204 can be formed by wall portion 214, 215, and 216. The wall portion 214 can be formed by the arm 199 and can have a terminal end 229 and connecting end 231. The wall portion 214 can be spaced away from and extend parallel to the rear planar surface 192. The wall portion 215 is formed by the arm 199 and extends perpendicularly to and away from the rear planar surface 192 from the connecting end 231 of the wall portion 214 to a connecting end 233 of the wall portion 216, which is formed by the arm 199 and extends from the connecting end 239 to a terminal end 237 in parallel to the rear planar surface 192 and the wall portion 214, and in a common direction as the wall portion 214. The wall portion 216 has a length that is less than the length of the wall portion 214.

In exemplary embodiments, each of the power track insert portions 206 and 208 have a retaining member 363, 364 formed proximate to at least one end of the bodies 207 and 209. When the power track insert portions 206 and 208 are inserted into the second and third pairs of channels, respectively, each retaining member 363, 364 can be aligned with a hole 365 formed in the arm 195 of the frame portion 190. A fastening member 222 can be insert through each hole 365 to engage the retaining members 363, 364 of the power track insert portions 206 and 208 to lock the power track insert portions 206 and 208 in place in the frame portion 190. The power track insert portion 206 and the power track insert portion 208 can be disposed within the multi-channel front portion 211 of the frame to obstruct the cavities formed by the channel 194 and 200, which can be accessible via the openings 210 formed in the power track insert portions 206 and 208. For example, electrically conductive arms of shelf assemblies can engage and extend through the openings 210 into the cavities of the channels 194 and 200 to selectively retain the shelf assemblies to the vertical upright 118' and place the electrical conductive arms in electrical contact with the power track inserts 206 or 208 so that electricity can flow to or from the shelf assemblies through the power track insert portions 206 or 208.

Figure 17:
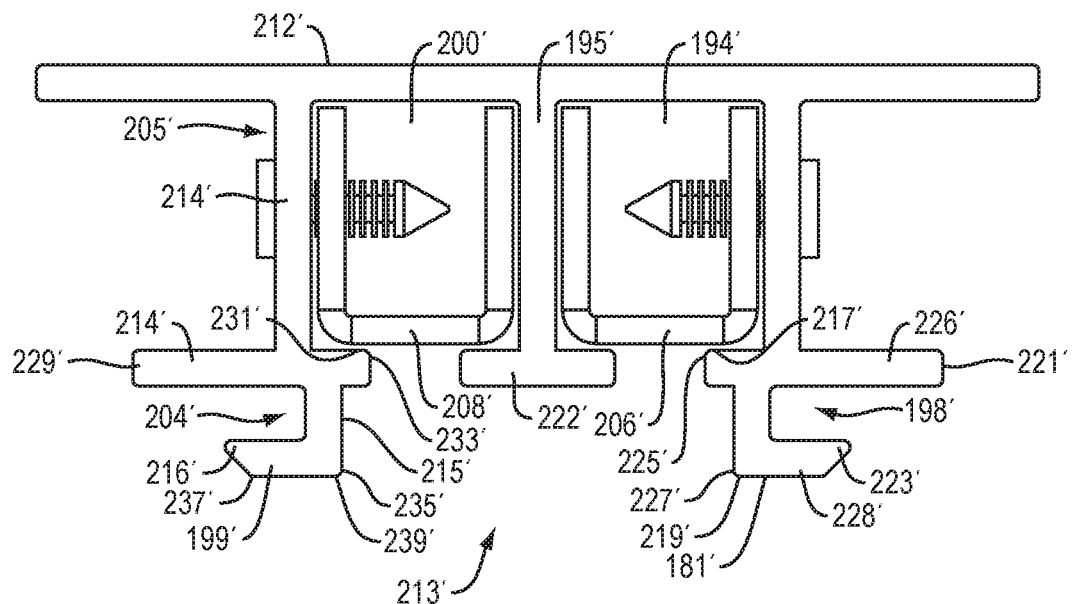
FIG. 17 depicts a cross-sectional view of an exemplary embodiment of another vertical upright of a wall assembly.
Figure 18:
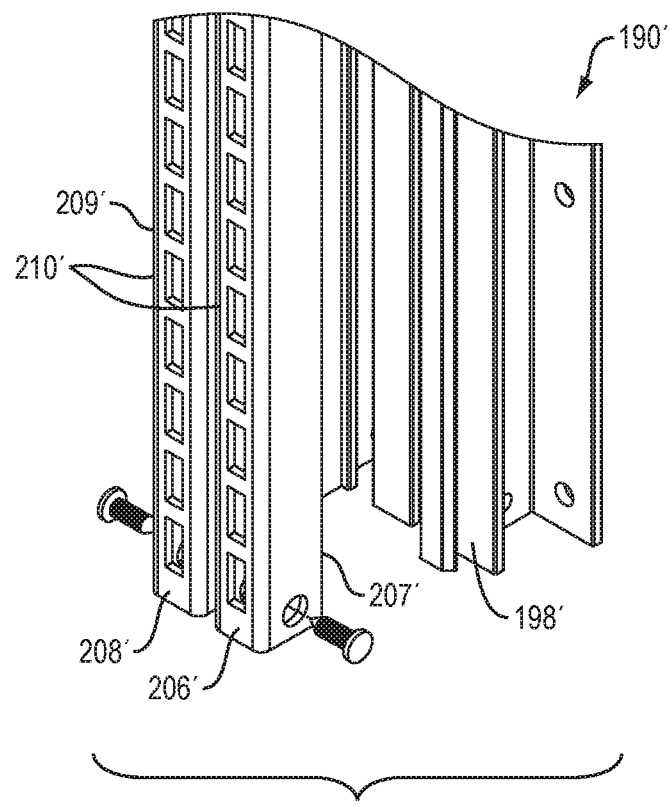
FIG. 18 depicts a front perspective view of an exemplary embodiment of another vertical track upright of a wall assembly.

FIG. 18 depicts an exploded front perspective view of an exemplary embodiment of one of the vertical uprights 118'. FIG. 17 is an assembled cross-sectional view of the vertical upright 118' shown in FIG. 18. The vertical upright 118' can include a frame portion 190' and a power track insert portions 206' and 208'. As shown in FIG. 18, the frame portion 190' can have an elongated body having a generally planar rear surface portion 192' configured to mount flush with cross bars (e.g., cross bars 124, 124', 124", 124''', 128, 128', 128", 128''') and a multi-channeled front portion 211'. The power track insert portions 206' and 208' can have generally planar elongate bodies 207' and 209', respectively. The bodies 207' and 209' can each have openings 210' formed therein, which can be distributed along a length of the bodies 207' and 209'. In exemplary embodiments, the frame portion 190' can be formed from an electrically insulating or electrically non-conductive material, such as a polymer (e.g., plastic), and the power track insert portions 206' and 208' can each be formed from an electrical conductive material, such as metal.

Referring to FIGS. 17 and 18, the multi-channeled front portion 211' of the frame portion 190' can have a first pair of channels including a channel 194' and a channel 200' and a second pair of channels including a channel 198' and a channel 204'. The first and second pairs of channels can be formed by arms 181', 195', 199', which generally extend perpendicularly outward from the planar rear surface 192' at an interface between a first end 205' of the arms 181', 195', 199' and the planar rear surface 192'. A second end 213' of the arms 181', 195', 199' can include contours that form the first and second pairs of channels.

The channels 194' and 200' that form the first pair of channels can be formed between the planar rear surface 192' and the arms 181' and 199'. For example, the arms 181' and 195' and the rear planar surface 192' can form the channel 194' and the arms 195' and 199' and the rear planar surface 192' can form the channel 200'. As depicted in FIGS. 17 and 18, the channels 194' and 200' can be U-shaped channels that open outwardly away from the planar rear surface 192' towards the second end 213' and can receive a portion of shelf assemblies as described in more detail herein. In exemplary embodiments, as depicted in FIG. 17, the channels 194' and 200' can be configured to receive the power track insert portion 206 such that the channels 194' and 200' retain the power track insert portion 206' in the multi-channel front portion 211'.

The channels 198' and 204' that form the second pair of channels can be formed by the arms 181' and 199', respectively, and can be spaced apart from the rear planar surface 192' such that the power track insert portions 206' and 208' can be recessed with respect to the channels 198' and 204' when the power track insert portions 206' and 208' are inserted into channels 194' and 200' respectively. The channels 198' and 204' can be opposingly spaced J-shaped channels that open away from each other and in parallel with the rear planar surface 192. The channel 198' can be configured to receive and selectively retain a side edge of a first front panel and the channel 204' can be configured to receive and selectively retain a side edge of a second front panel to hold the first and second front panels in a common plane with respect to the vertical upright 118'.

The J-shape of the channel 198' can be formed by wall portion 226', 227', and 228'. The wall portion 226' can be formed by the arm 181' and can have a terminal end 221' and connecting end 217'. The wall portion 226' can be spaced away from and extend parallel to the rear planar surface 192'. The wall portion 227' is formed by the arm 181' and extends perpendicularly to and away from the rear planar surface 192' from the connecting end 217' of the wall portion 226' to a connecting end 219' of the wall portion 228', which is formed by the arm 181' and extends from the connecting end 219' to a terminal end 223' in parallel to the rear planar surface 192' and the wall portion 226', and in a common direction as the wall portion 226'. The wall portion 228' has a length that is less than the length of the wall portion 226'.

The J-shape of the channel 204' can be formed by wall portion 214', 215', and 216'. The wall portion 214' can be formed by the arm 199' and can have a terminal end 229' and connecting end 231'. The wall portion 214' can be spaced away from and extend parallel to the rear planar surface 192'. The wall portion 215' is formed by the arm 199' and extends perpendicularly to and away from the rear planar surface 192' from the connecting end 231' of the wall portion 214' to a connecting end 233' of the wall portion 216', which is formed by the arm 199' and extends from the connecting end 239' to a terminal end 237' in parallel to the rear planar surface 192' and the wall portion 214', and in a common direction as the wall portion 214'. The wall portion 216' has a length that is less than the length of the wall portion 214'.

In exemplary embodiments, each of the power track insert portions 206' and 208' have a retaining member 363' (not shown), 364' formed proximate to at least one end of the bodies 207' and 209'. When the power track insert portions 206' and 208' are inserted into channels 194' and 200', respectively, each retaining member 363', 364' can be aligned with a hole 365' formed in the arms 181', 199' of the frame portion 190'. A fastening member 222' can be inserted through each hole 365' to engage the retaining members 363', 364' of the power track insert portions 206' and 208' to lock the power track insert portions 206' and 208' in place in the frame portion 190'. The power track insert portion 206' and the power track insert portion 208' can be U-shaped and disposed within the multi-channel front portion 211' of the frame to obstruct the openings of U-shaped channels 194' and 200', which can be accessible via the openings 210' formed in the power track insert portions 206' and 208'. For example, electrically conductive arms of shelf assemblies can engage and extend through the openings 210' into the cavities of the channels 194' and 200' to selectively retain the shelf assemblies to the vertical upright 118' and place the electrically conductive arms in electrical contact with the power track inserts 206' or 208' so that electricity can flow to or from the shelf assemblies through the power track insert portions 206' or 208'.

Figure 19A:
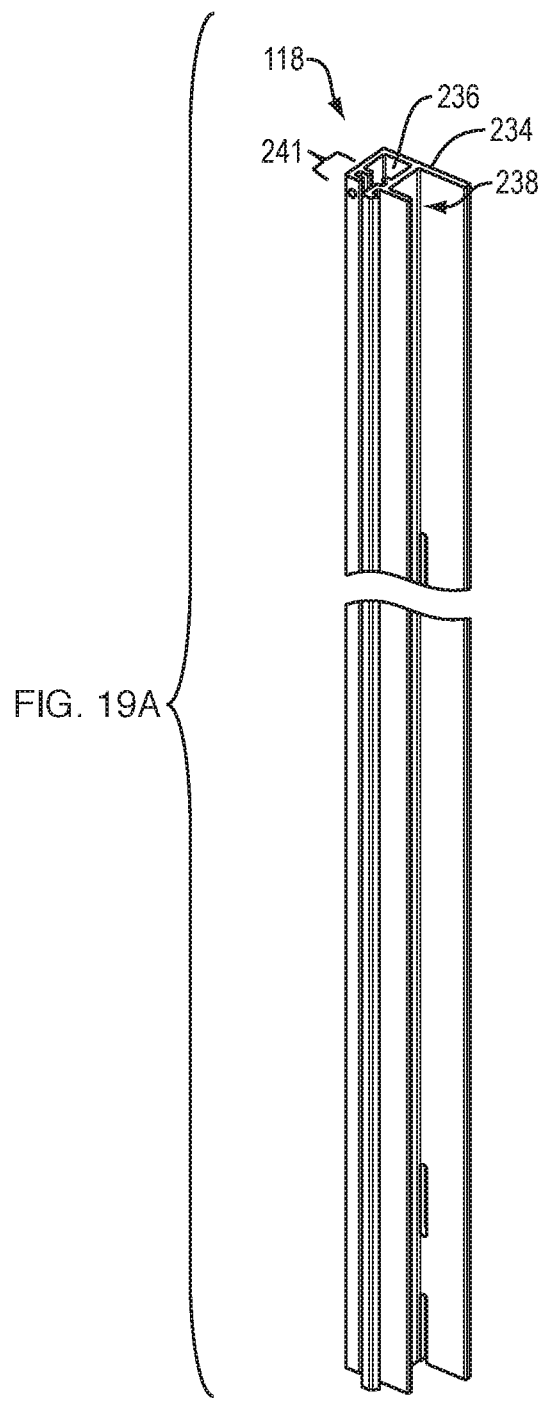
FIG. 19A depicts a front perspective view of an exemplary embodiment of a left upright end assembly of a wall assembly.
Figure 20A:
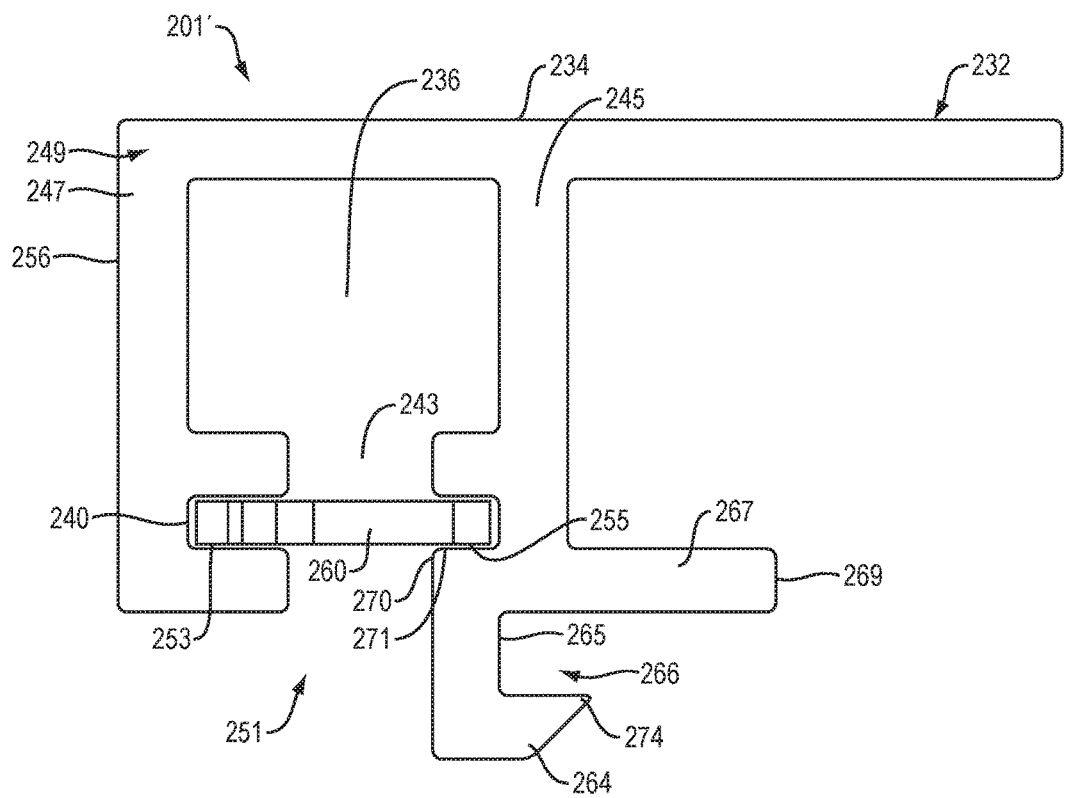
FIG. 20A depicts a cross-sectional view of an exemplary embodiment of a left upright end assembly of a wall assembly.

FIG. 19A depicts a front perspective view of an exemplary embodiment of one of the vertical uprights 118 that forms a left upright end assembly of the wall assembly. FIG. 20A is an assembled top view of the vertical upright 118 of FIG. 19A. As shown in FIG. 19A, a frame portion 232 of the vertical upright 118 can have an elongated body having a generally planar rear surface portion 234 configured to mount flush with cross bars (e.g., cross bars 124, 124', 124", 124''', 128, 128', 128", 128''') and a multi-channeled front portion 241. The vertical upright 118 can include the frame portion 232 and a slotted power track insert portion 260 as shown in FIG. 20A. The slotted power track insert portion 260 has a similar structure as the power track insert portion 206 depicted in FIGS. 15 and 16. In exemplary embodiments, the frame portion 232 can be formed from an electrically insulating or electrically non-conductive material, such as a polymer (e.g., plastic), and the power track insert portion 260 can each be formed from an electrical conductive material, such as metal.

Referring to FIGS. 19A and 20A, the multi-channeled front portion 241 of the frame portion 232 can have a first channel 236, a second channel 253, a third 255, and a fourth channel 266. The first channel 236 can be formed by arms 245 and 247, which generally extend perpendicularly outward from the planar rear surface 234 at an interface between a first end 249 of the arms 245 and 247, and the planar rear surface 234. A second end 251 of the arms 245 and 247 can include contours that form the second through fourth channels 253, 255, and 266.

The first channel 236 can be formed between the planar rear surface 234 and the arms 245 and 247. For example, the arms 245 and 247 and the rear planar surface 234 can form the channel 236. As depicted in FIGS. 19A and 20A, the channel 236 can be U-shaped that opens outwardly away from the planar rear surface 234 and towards the second end 251. The first channel 236 can be configured to receive a portion of the shelf assemblies as described in more detail herein.

The channels 253 and 255 form a pair of channels between the arms 245 and 247 within the channel 236. The channels 253 and 255 can be spaced away from the rear planar surface 234 and can be perpendicular to the channel 236. As depicted in FIGS. 19A and 20A, the channel 253 can be formed by the arm 247 and the channel 255 can be formed by the arm 245. The channels 253 and 255 can be opposingly spaced U-shaped channels that open towards each other. In exemplary embodiments, as depicted in FIG. 20A, the channels 253 and 255 can be configured to receive the power track insert portion 260 such that the channels 253 and 255 retain the power track insert portion 260 in the multi-channel front portion 241 in parallel relation to the rear planar surface 234 and in a plane that includes the power track insert 260.

The fourth channel 266 extends from the arm 245, and can be distanced further away from the rear planar surface than the second and third pairs of channels such that the power track insert portions 260 can be recessed with respect to the channel 266 when the power track insert portion 260 is inserted into the second and third pairs of channels, respectively. The channel 266 can be a J-shaped channel in parallel with channels 253 and 255, and with the rear planar surface 234. The channel 266 can be configured to receive and selectively retain a side edge of a front panel to hold the front panel in a common plane with respect to the vertical upright 118'.

The J-shape of the channel 266 can be formed by wall portion 264, 265, and 267. The wall portion 267 can be formed by the arm 245 and can have a terminal end 269 and connecting end 270. The wall portion 267 can be spaced away from and extend parallel to the rear planar surface 234. The wall portion 265 is formed by the arm 245 and extends perpendicularly to and away from the rear planar surface 234 from the connecting end 270 of the wall portion 264 to a connecting end 273 of a wall portion 267, which is formed by the arm 264 and extends from the connecting end 273 to a terminal end 274 in parallel to the rear planar surface 234 and the wall portion 265, and in a common direction as the wall portion 267. The wall portion 264 has a length that is less than the length of the wall portion 267.

Figure 20B:
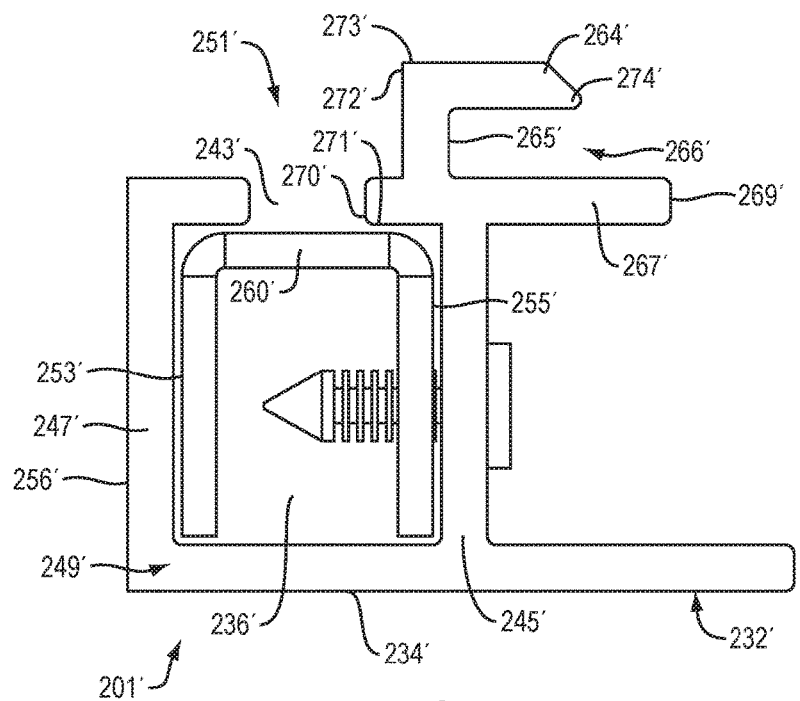
FIG. 20B depicts a cross-sectional view of an exemplary embodiment of another left upright end assembly of a wall assembly.

FIG. 19B depicts a front perspective view of an exemplary embodiment of one of the vertical uprights 118' that forms a left upright end assembly of the wall assembly. FIG. 20B is an assembled top view of the vertical upright 118' of FIG. 19B. As shown in FIG. 19B, a frame portion 232' of the vertical upright 118' can have an elongated body having a generally planar rear surface portion 234' configured to mount flush with cross bars (e.g., cross bars 124, 124', 124", 124''', 128, 128', 128", 128''') and a multi-channeled front portion 241'. The vertical upright 118' can include the frame portion 232' and a slotted power track insert portion 260' as shown in FIG. 20B. The slotted power track insert portion 260' has a similar structure as the power track insert portion 206' depicted in FIGS. 17 and 18. In exemplary embodiments, the frame portion 232' can be formed from an electrically insulating or electrically non-conductive material, such as a polymer (e.g., plastic), and the power track insert portion 260' can each be formed from an electrical conductive material, such as metal.

Referring to FIGS. 19B and 20B, the multi-channeled front portion 241' of the frame portion 232' can have a first channel 236' and a second channel 266. The first channel 236' can be formed by arms 245' and 247', which generally extend perpendicularly outward from the planar rear surface 234' at an interface between a first end 249' of the arms 245' and 247', and the planar rear surface 234'. A second end 251' of arms 245' can include contours that form the second channel 266'.

The first channel 236' can be formed between the planar rear surface 234' and the arms 245' and 247'. For example, the arms 245' and 247' and the rear planar surface 234' can form the channel 236'. As depicted in FIGS. 19B and 20B, the channel 236' can be U-shaped that opens outwardly away from the planar rear surface 234' and towards the second end 251'. The first channel 236' can be configured to receive a portion of the shelf assemblies as described in more detail herein. In exemplary embodiments, as depicted in FIG. 20B, the channel 236' can be configured to receive the power track insert portion 260' such that the channel 236' retains the power track insert portion 260' in the multi-channel front portion 241'.

The second channel 266' extends from the arm 245', and can be spaced apart from the rear planar surface 234' such that the power track insert portions 260' can be recessed with respect to the channel 266' when the power track insert portion 260' is inserted into the first channel 236'. The channel 266' can be a J-shaped channel in parallel with the rear planar surface 234'. The channel 266' can be configured to receive and selectively retain a side edge of a front panel to hold the front panel in a common plane with respect to the vertical upright 118'.

The J-shape of the channel 266' can be formed by wall portion 264', 265', and 267'. The wall portion 267' can be formed by the arm 245' and can have a terminal end 269' and connecting end 270'. The wall portion 267' can be spaced away from and extend parallel to the rear planar surface 234'. The wall portion 265' is formed by the arm 245' and extends perpendicularly to and away from the rear planar surface 234' from the connecting end 270' of the wall portion 264' to a connecting end 273' of a wall portion 267', which is formed by the arm 264' and extends from the connecting end 273' to a terminal end 274' in parallel to the rear planar surface 234' and the wall portion 265', and in a common direction as the wall portion 267'. The wall portion 264' has a length that is less than the length of the wall portion 267'.

Figure 22A:
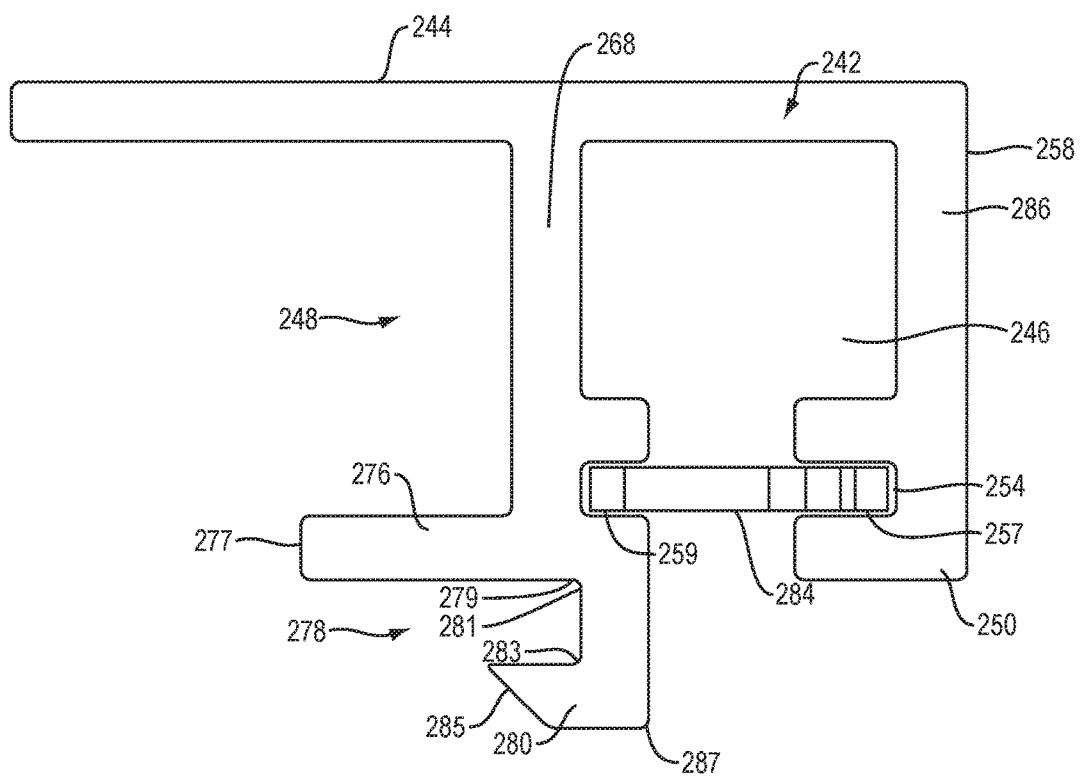
FIG. 22A depicts a cross-sectional view of an exemplary embodiment of a right upright end assembly of a wall assembly.

FIG. 21A depicts a front perspective view of an exemplary embodiment of one of the vertical uprights 118 that forms a right track upright of the wall assembly. FIG. 22A is an assembled top view of the vertical upright 118 of FIG. 21A. As shown in FIG. 21A, a frame portion 242 of the vertical upright 118 can have an elongated body having a generally planar rear surface portion 244 configured to mount flush with cross bars (e.g., cross bars 124, 124', 124", 124''', 128, 128', 128", 128''') and a multi-channeled front portion 271. The vertical upright 118 shown in FIGS. 21A and 22A can include a frame portion 242 and a slotted power track insert portion 252. As shown in FIG. 22A the slotted power track insert portion 252 has a similar structure as the power track insert portion 208 depicted in FIGS. 15 and 16. In exemplary embodiments, the frame portion 242 can be formed from an electrically insulating or electrically non-conductive material, such as a polymer (e.g., plastic), and the power track insert portion 252 can each be formed from an electrical conductive material, such as metal.

Referring to FIGS. 21A and 22A, the multi-channeled front portion 271 of the frame portion 242 can have a first channel 248, a second channel 246, a third channel 254, and a fourth channel 278. The first channel can be formed by arms 268 and 286, which generally extend perpendicularly outward from the planar rear surface 244 at an interface between a first end 258 of the arms 268 and 286, and the planar rear surface 244. A second end 250 of the arms 268 and 286 can include contours that form the second through fourth pairs of channels 246, 254, 278.

The second channel 246 can be formed between the planar rear surface 244 and the arms 268 and 286. For example, the arms 268 and 286 and the rear planar surface 244 can form the channel 246. As depicted in FIGS. 21A and 22A, the channel 246 can be U-shaped that opens outwardly away from the planar rear surface 244 and towards the second end 250. The second channel 246 can be configured to receive a portion of the shelf assemblies as described in more detail herein.

The channels 257 and 259 forms a pair of channels between the arms 268 and 286 within the channel 246. The channels 257 and 259 can be spaced away from the rear planar surface 244 and can be perpendicular to the channel 246. As depicted in FIGS. 21A and 22A, the channel 257 can be formed by the arm 286 and the channel 259 can be formed by the arm 268. The channels 257 and 259 can be opposingly spaced U-shaped channels that open towards each other. In exemplary embodiments, as depicted in FIG. 22A, the channels 257 and 259 can be configured to receive the power track insert portion 252 such that the channels 257 and 259 retain the power track insert portion 252 in the multi-channel front portion 271 in parallel relation to the rear planar surface 244 and in a plane that includes the power track insert 252.

The fourth channel 278 can be formed by the arm 268, and can be distanced further away from the rear planar surface than the second and third pairs of channels such that the power track insert portions 252 can be recessed with respect to the channel 278 when the power track insert portion 252 is inserted into the second and third pairs of channels, respectively. The channel 278 can be a J-shaped channel in parallel with channel 254 of the second channel, and with the rear planar surface 244. The channel 278 can be configured to receive and selectively retain a side edge of a front panel to hold the front panel in a common plane with respect to the vertical upright 118.

The J-shape of the channel 278 can be formed by wall portion 276, 262, and 280. The wall portion 276 can be formed by the arm 268 and can have a terminal end 277 and connecting end 279. The wall portion 276 can be spaced away from and extend parallel to the rear planar surface 244. The wall portion 262 is formed by the arm 268 and extends perpendicularly to and away from the rear planar surface 244 from the connecting end 281 of the wall portion 262 to a connecting end 283 of a wall portion 280, which is formed by the arm 280 and extends from the connecting end 287 to a terminal end 285 in parallel to the rear planar surface 244 and the wall portion 276, and in a common direction as the wall portion 276. The wall portion 280 has a length that is less than the length of the wall portion 267.

Figure 22B:
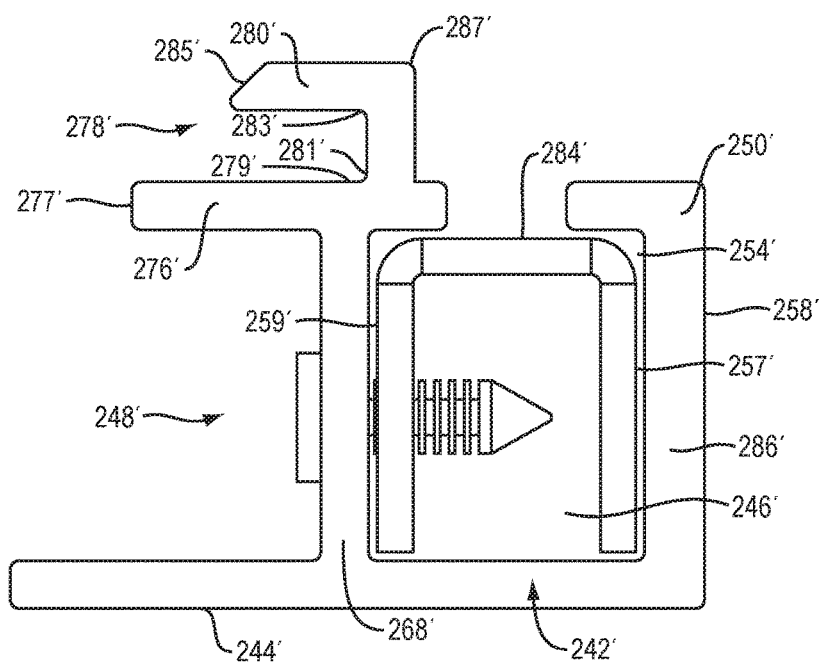
FIG. 22B depicts a cross-sectional view of an exemplary embodiment of another right upright end assembly of a wall assembly.

FIG. 21B depicts a front perspective view of an exemplary embodiment of one of the vertical uprights 118' that forms a right track upright of the wall assembly. FIG. 22B is an assembled top view of the vertical upright 118' of FIG. 21B. As shown in FIG. 21B, a frame portion 242' of the vertical upright 118' can have an elongated body having a generally planar rear surface portion 244' configured to mount flush with cross bars (e.g., cross bars 124, 124', 124", 124''', 128, 128', 128", 128''') and a multi-channeled front portion 271'. The vertical upright 118' shown in FIGS. 21B and 22B can include a frame portion 242' and a slotted power track insert portion 252'. As shown in FIG. 22B the slotted power track insert portion 252' has a similar structure as the power track insert portion 208' depicted in FIGS. 17 and 18. In exemplary embodiments, the frame portion 242' can be formed from an electrically insulating or electrically non-conductive material, such as a polymer (e.g., plastic), and the power track insert portion 252' can be formed from an electrical conductive material, such as metal.

Referring to FIGS. 21B and 22B, the multi-channeled front portion 271' of the frame portion 242' can have a first channel 248', a second channel 246', and a third channel 278. The first channel can be formed by arms 268' and 286', which generally extend perpendicularly outward from the planar rear surface 244' at an interface between a first end 258' of the arms 268' and 286', and the planar rear surface 244'. A second end 250' of the arms 268' and 286' can include contours that form the second and third pairs of channels 246', 278'.

The second channel 246' can be formed between the planar rear surface 244' and the arms 268' and 286'. For example, the arms 268' and 286' and the rear planar surface 244' can form the channel 246'. As depicted in FIGS. 21B and 22B, the channel 246' can be U-shaped and open outwardly away from the planar rear surface 244' and towards the second end 250'. The second channel 246' can be configured to receive a portion of the shelf assemblies as described in more detail herein. In exemplary embodiments, as depicted in FIG. 22B, the channel second channel 246' can be configured to receive the power track insert portion 252' such that the channel 246' retains the power track insert portion 252' in the multi-channel front portion 271'.

The third channel 278' can be formed by the arm 268', and can be spaced apart from the rear planar surface 244' such that the power track insert portions 252' can be recessed with respect to the channel 278' when the power track insert portion 252' is inserted into the second channel 246'. The channel 278' can be a J-shaped channel in parallel with the rear planar surface 244'. The channel 278' can be configured to receive and selectively retain a side edge of a front panel to hold the front panel in a common plane with respect to the vertical upright 118'.

The J-shape of the channel 278' can be formed by wall portions 276', 262', and 280'. The wall portion 276' can be formed by the arm 268' and can have a terminal end 277' and connecting end 279'. The wall portion 276' can be spaced away from and extend parallel to the rear planar surface 244'. The wall portion 262' is formed by the arm 268' and extends perpendicularly to and away from the rear planar surface 244' from the connecting end 281' of the wall portion 262' to a connecting end 283' of a wall portion 280', which is formed by the arm 280' and extends from the connecting end 287' to a terminal end 285' in parallel to the rear planar surface 244' and the wall portion 276', and in a common direction as the wall portion 276'. The wall portion 280' has a length that is less than the length of the wall portion 267'.

Figure 23:
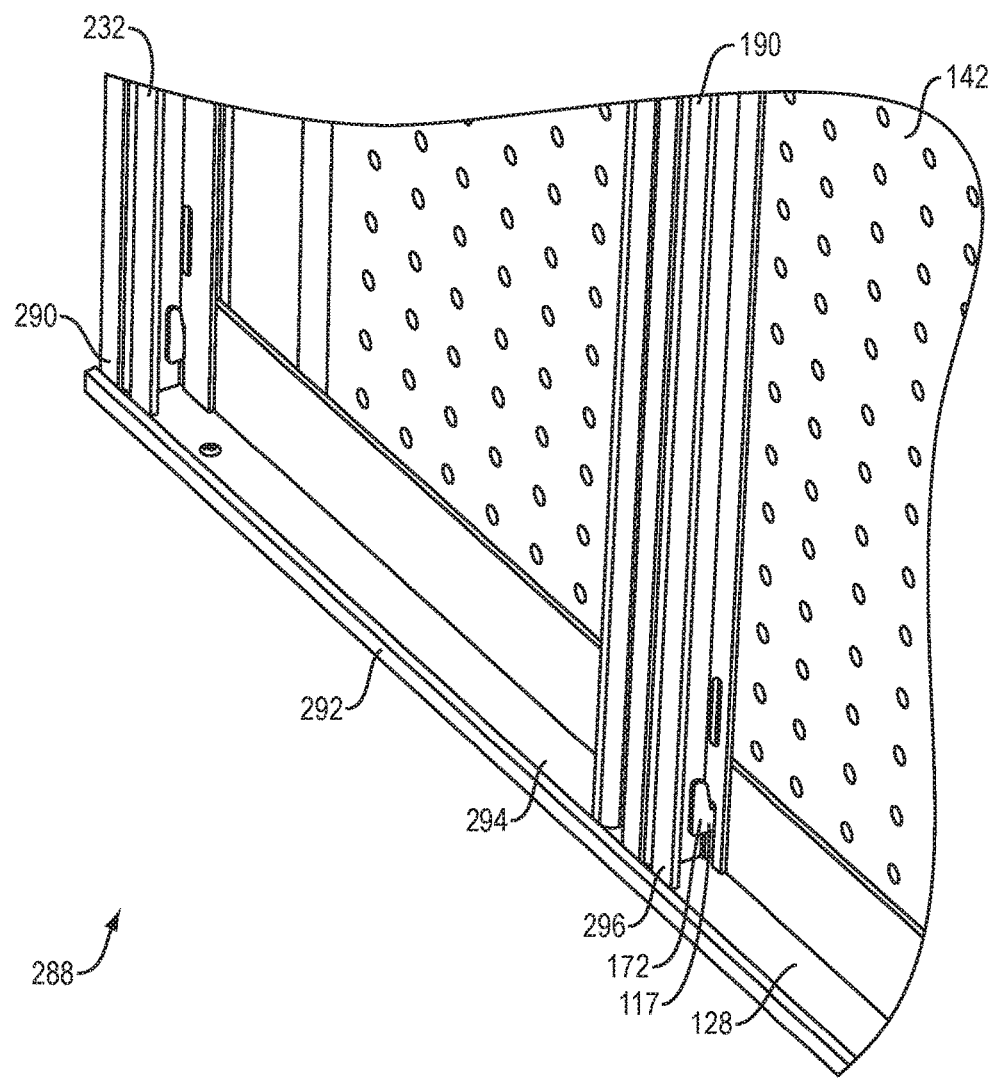
FIG. 23 depicts an exemplary interaction between a vertical upright and a horizontal cross bar in accordance with exemplary embodiments of the present disclosure.

FIG. 23 depicts an exemplary cooperative engagement between a vertical upright and a cross bar assembly. As shown in FIG. 23, the lower wall assembly 288 includes a lower cross bar 128, a left vertical upright 232, a double vertical upright 190, and a back panel 142. In the present embodiment, the left vertical upright 232 and the double vertical upright 190 can be fully seated with the bottom edge of the left vertical upright 290 and the double vertical upright 296 flush mounted against the bottom lip 294 of the lower cross bar 128. The front hook 172 can align with and extend through openings 117 in the left vertical upright 232 and the double vertical upright 190 to create a vertical offset between the opening 117 so that the hook 172 abuts a surface of the body of the vertical upright 232 and 190 to selectively retain the vertical upright 232, 190 to the crossbar.

Figure 24:
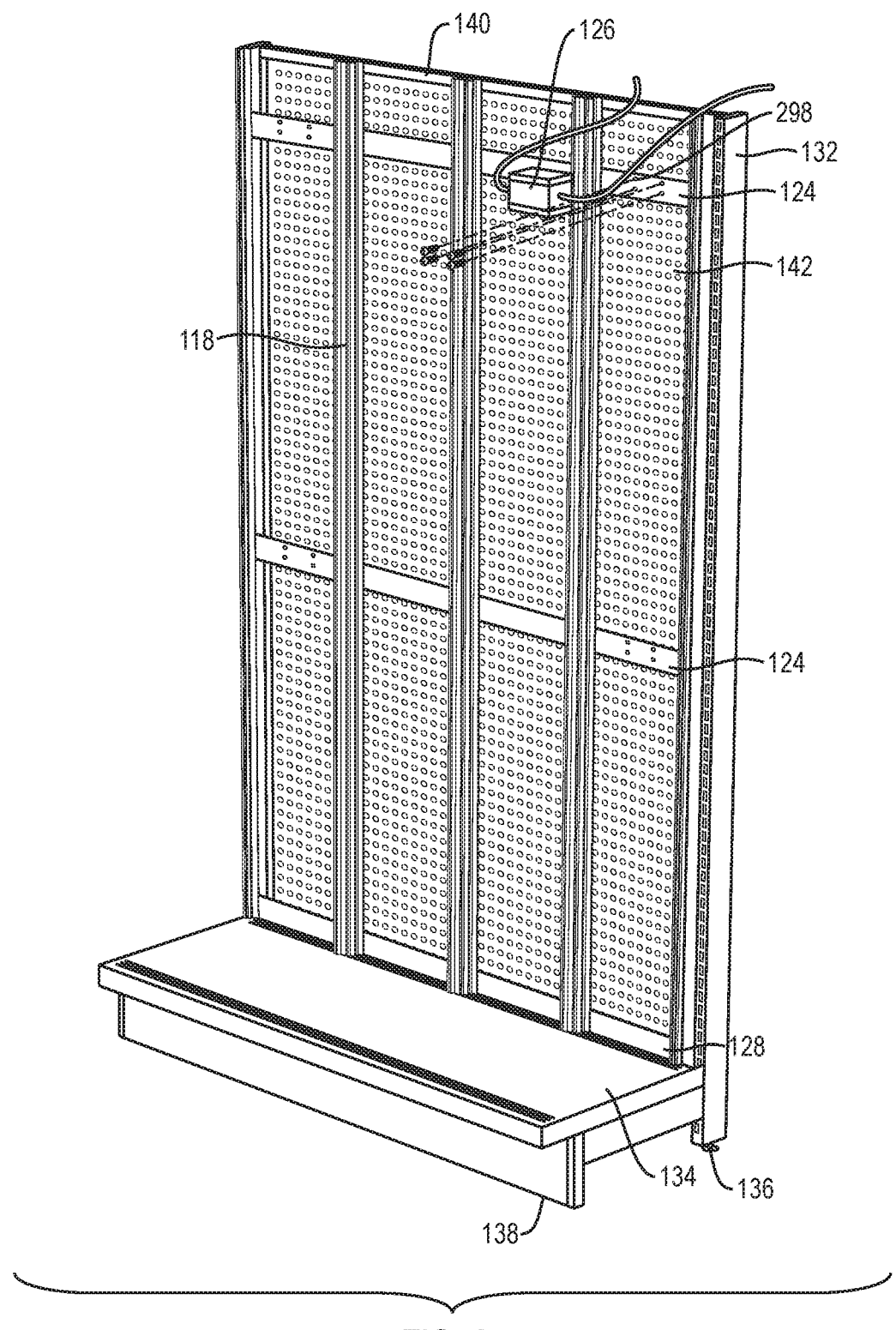
FIG. 24 depicts an exemplary embodiment of a power supply being mounted to a wall assembly.

FIG. 24 depicts an exemplary embodiment of the power supply 126 being mounted to the back panel 142 of the vertical support structure. In some embodiments the power supply 126 can be operatively coupled to the cross bar 124 and can be configured to provide electricity to the merchandise display wall system 100. For example, a power supply bracket 298 can be detachably coupled to the cross bar 124 and the power supply 126 can be mounted to the bracket 298. In some embodiments, the power supply 126 can be operatively coupled to the lower cross bar 128 or the back panel 142. The power supply 126 can be reset, removed or rearranged, with the vertical uprights 118 and cross bars 124, 128 or independent of the vertical uprights 118 and the cross bars 124, 128. Reconfiguration can be used to adapt to new power requirements of product displays or to adapt to retail facility resets.

Figure 25:
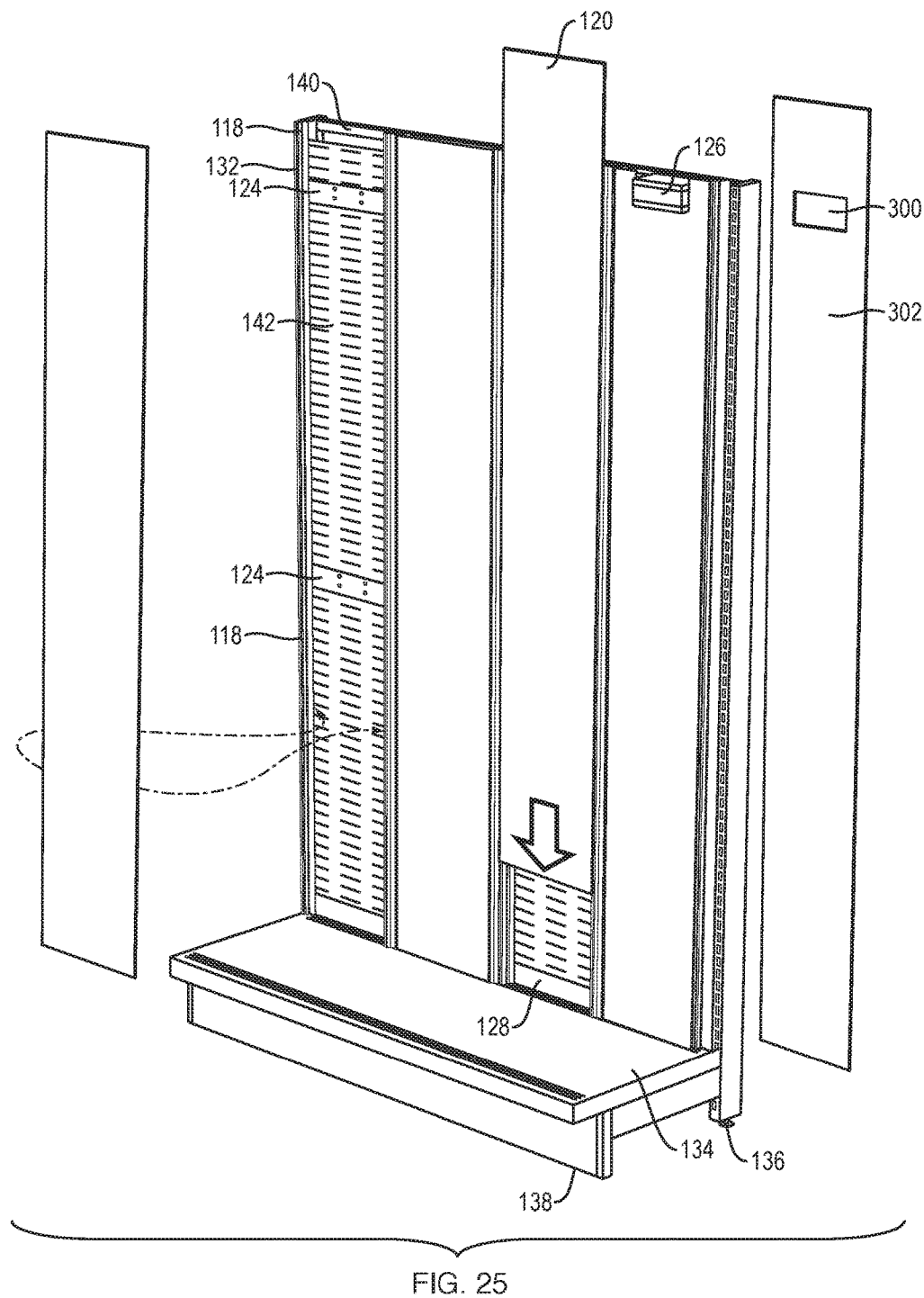
FIG. 25 depicts an exemplary embodiment of front panels being attached to the wall assembly.

FIG. 25 depicts a front perspective view illustrating an attachment of the front panels 120 to the wall assembly 130. In some embodiments the front panel 120 can be operatively coupled to the vertical uprights 118. For example, as described above, the vertical uprights include J-channels that are configured to receive a side edge of front panels 120. For J-channels of adjacent vertical uprights can each receive a side edge of one of the front panels 120 by sliding or snapping the front panel into the J-channels from a vertical or horizontal position. As such, the J-channels of adjacent vertical uprights can provide a track for retaining the front panels. In some embodiments, the front panel 120 may have a uniform front surface extending from the top edge to the bottom edge of the back panel 142.

In some embodiments, at least one of the front panels 120 may have a knock out 300 to provide access to a component positioned on the back panel 142 or cross bars 124, 128, such as the power supply 126 or the like. In some embodiments, the knock out 300 can be positioned along the top edge, bottom edge, side edge, or without contacting any edges of the front panel in which the knock is formed. In exemplary embodiments, the merchandise display wall system 100 can have a reconfigurable arrangement allowing for one or more of the front panels 120 to be reset, removed or rearranged, either as group or independent of one another. In exemplary embodiments, the panel 120 can be formed of a plastic material or an alternate electrically isolating material.

Figure 26:
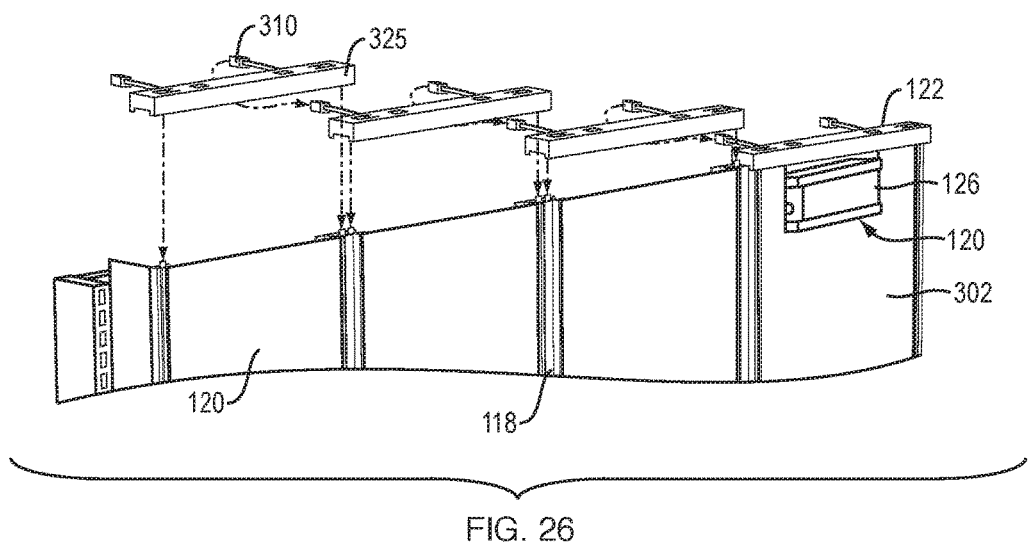
FIG. 26 depicts an exemplary embodiment of top caps being operatively coupled to a wall assembly.

FIG. 26 depicts an exemplary embodiment of top caps 122 being operatively coupled to the wall assembly 130. The top caps 122 can each include an elongate housing 325 and an electric harness 310. The elongate housing 325 of the top caps 122 can be formed using any suitable materials including, plastic, fiberglass, and the like. In exemplary embodiments, the top cap 122 can be coupled to the wall assembly 130, by placing the elongate housing 325 of top caps 122 perpendicular to the vertical uprights 118 and the front panels 120 and operatively coupling the top caps 122 to the vertical uprights 118. The harness 310 of the top caps 122 can be configured to provide electricity to the merchandise display wall system 100 from the power supply 126. For example, the harnesses can receive electricity from the power supply 126 and can be in electrical contact with the power track insert portions of the vertical uprights to provide electricity to the vertical uprights. The top caps 122 can be detachably coupled to the vertical uprights by a friction fit, a snap fit, or the like.

Figure 27:
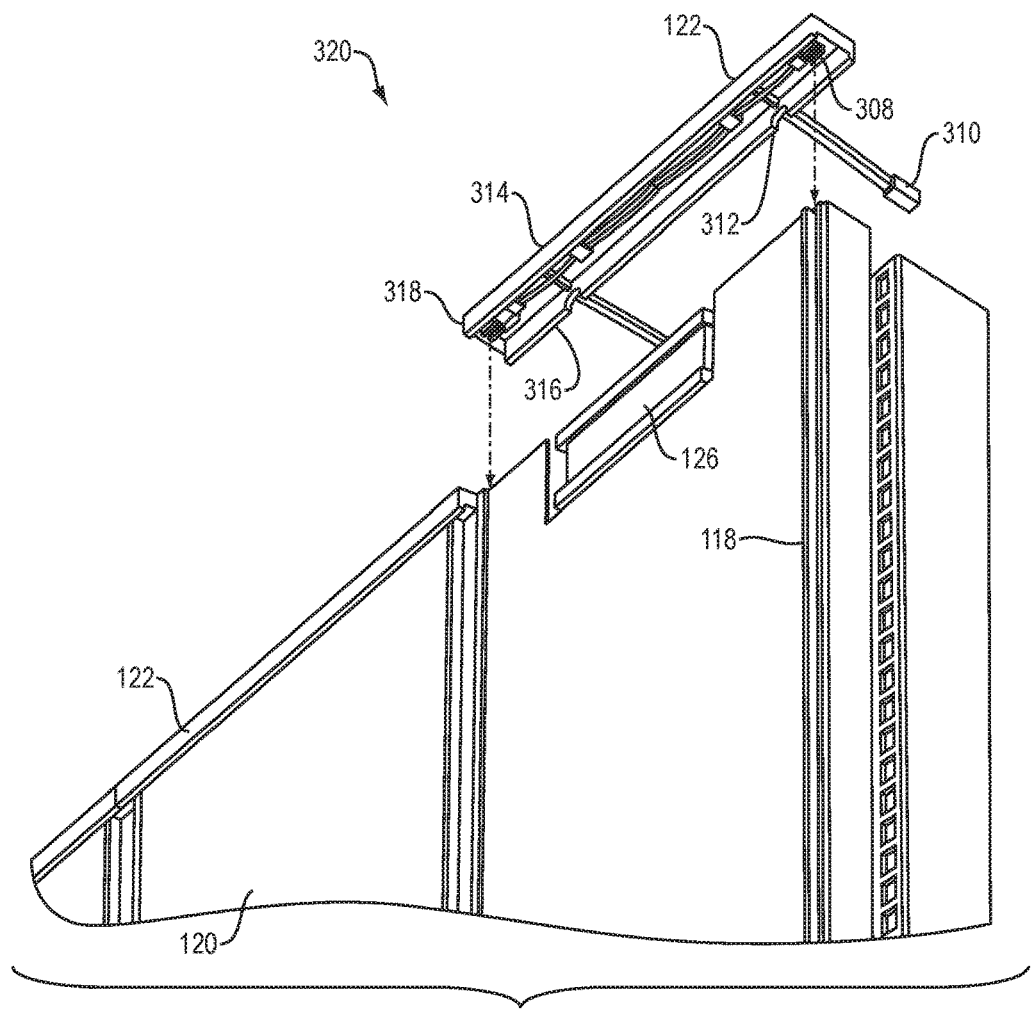
FIG. 27 depicts an exemplary embodiment of a front perspective view of the top cap operatively coupled to a wall assembly.
Figure 28:
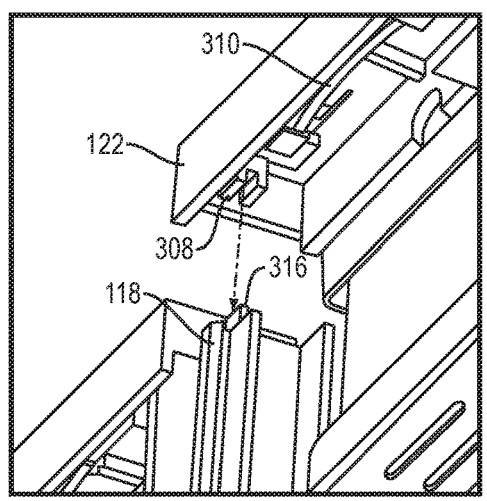
FIG. 28 depicts a more detailed view of an interaction between the top cap and a wall assembly.

FIGS. 27 and 28 illustrate the structure of the top cap and depict how and where it attached to the wall assembly 130. FIG. 27 depicts an exemplary embodiment of a front perspective view of the top cap configured to engage the wall assembly. FIG. 28 depicts a more detailed view of a portion of the top cap features shown in FIG. 27. As shown in FIG. 28, the top cap connects to the conducting portion of the vertical upright (e.g., power track insert portions 206, 208, or both).

In an exemplary embodiment, with reference to FIGS. 27 and 28, the housing 325 of the top cap 122 can include a front surface 314 configured to fit around the perimeter of the wall assembly 130, including the vertical uprights 118 and the front panels 120. A rear surface 309 can include cut outs 312 configured to provide ports for the wire harness 310 to enter and exit the housing 325. The wiring harness 310 can be operatively coupled to the power supply 126 to supply power from the power supply 126 to the power track insert portions of the vertical uprights 118, while the frame portion of the vertical uprights electrically insulates the power insert track portions from the other components of the wall assembly 130. The top cap 122 can be configured with electrical contacts 308 that can be detachably and electrically coupled to the vertical uprights 118. For example, in some embodiments, electrical contacts 308 coupled to the wire harness 310. The electrical contacts 308 can be in electrical contact with a pair of adjacent vertical uprights of the wall assembly 130 (e.g., one of the electrical contacts 308 can be electrically coupled to a power track insert portion in one of the vertical uprights in the pair and one of the electrical contacts 308 in the top cap 122 can be electrically coupled to a power track insert portion in the other vertical upright in the pair). In exemplary embodiments, the power supply 126 may provide power to one or more of the top caps 122 of the wall assembly 130. For example, in some embodiments, the wire harnesses 310 of the top caps 122 can be connected in series with each other and with the power supply 126, as described in more detail below.

Referring still to FIGS. 27 and 28, once the wire harness 310 is electrically coupled to the power supply 126 and one or more vertical uprights 118, the power supply 126 can provide electricity or power to a shelf assembly to power the shelf assembly. For example, the shelf assembly can include electrical circuitry to illuminate one or more areas of the wall assembly 130 such that electricity from the power supply can flow through the wire harness 310 of the top cap 122 and one or more power track insert portions of one or more vertical uprights 118 and to the shelf assembly to energize the electrical circuitry.

Figure 29:
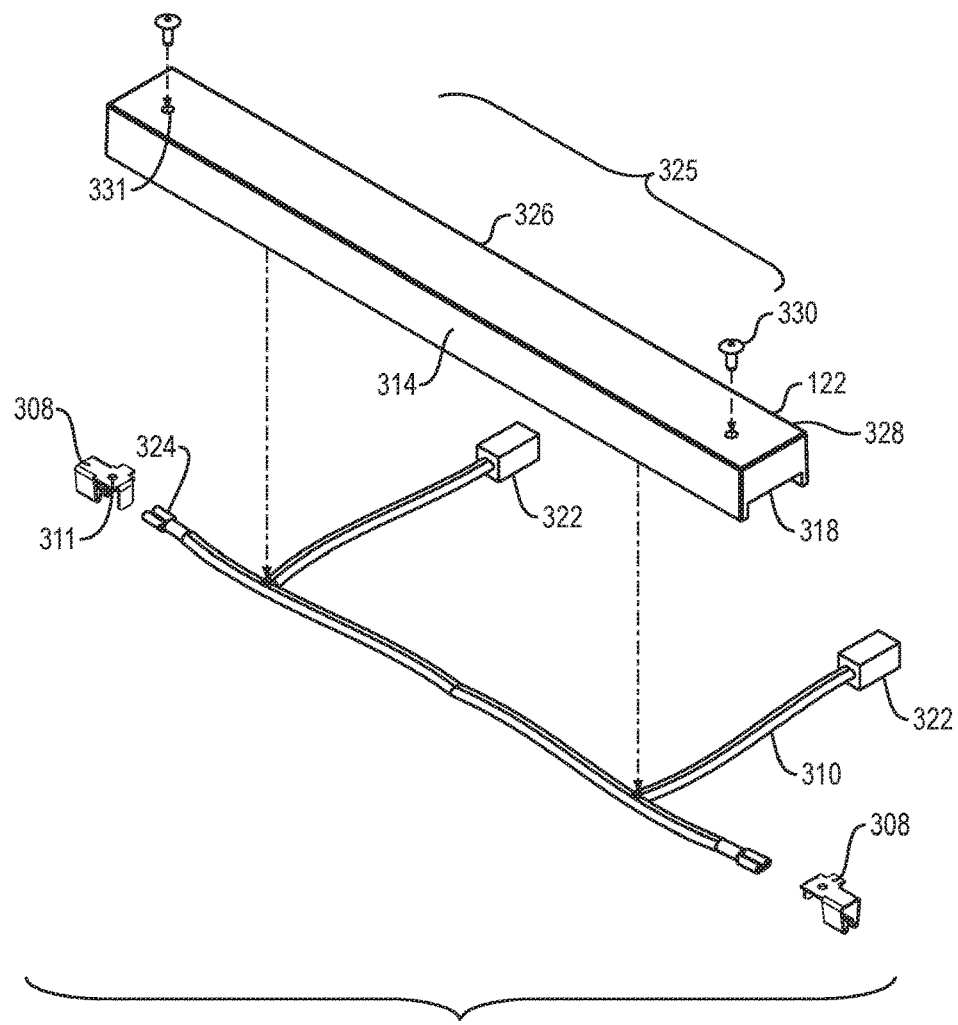
FIG. 29 depicts an exploded view of an exemplary embodiment of a top cap of a wall assembly.

FIG. 29 depicts an exploded view of an exemplary embodiment of the top cap 122 of the wall assembly 130. Referring to FIG. 29, the housing 325 of the top cap 122 can include a front surface 314, a top surface 326, a rear surface 328 and end walls 318. In some embodiments, the front surface 314 of the top cap 122 can extend along the horizontal axis in a generally linear manner. The side walls 318 can extend between the front surface 314 and the rear surface 328. The side walls 318 can extend from the top surface 326 downward, terminating before the bottom edge of the side wall becomes flush with the bottom edge of the front surface 314 and the rear surface 328.

A wire assembly of the top cap 122 includes the wiring harness 310, or anywhere in between mating electrical connectors 324, electrical contacts 308 and external connectors 322. The mating electrical connectors 324 can be disposed at terminal ends of the wiring harness 310 and can be detachably coupled to the electrical contacts 308. The wire harness 310 can be operatively coupled to the housing 325 of the top cap 122 with fasteners 330, such as rivets, screws, bolts, or the like. For example, in some embodiments, the electrical contacts 308 can include a hole 311 that is configured to align with a hole 331 formed in the top surface 326 of the housing 325. The fastener can be configured to extend through the top surface 326 and engage the hole 311 in the electrical contact 308 to secure the assembled wire harness 308 to the housing 325. The electrical contacts 308 can be electrically coupled to mating connector 324 formed by a pair of resilient prongs. In some embodiments, the mating connector 324 can be configured to directly engage the power track insert portions of a vertical upright to secure the top cap 122 to the wall assembly 130 and provide electrical power to the power track insert portions.

The external connectors 322 can be configured to electrically connect the top cap 122 to other top caps 122 and to a power supply (e.g., the power supply 126). In some embodiments, the top cap 122 can include two of the external connectors 322, where a first one of the external connectors can be connected to receive electricity from a component, such as a power supply or another top cap and a second one of the external connectors 322 can be configured to provide electricity flowing through the top cap to another component, such as another top cap 122.

Figure 30:
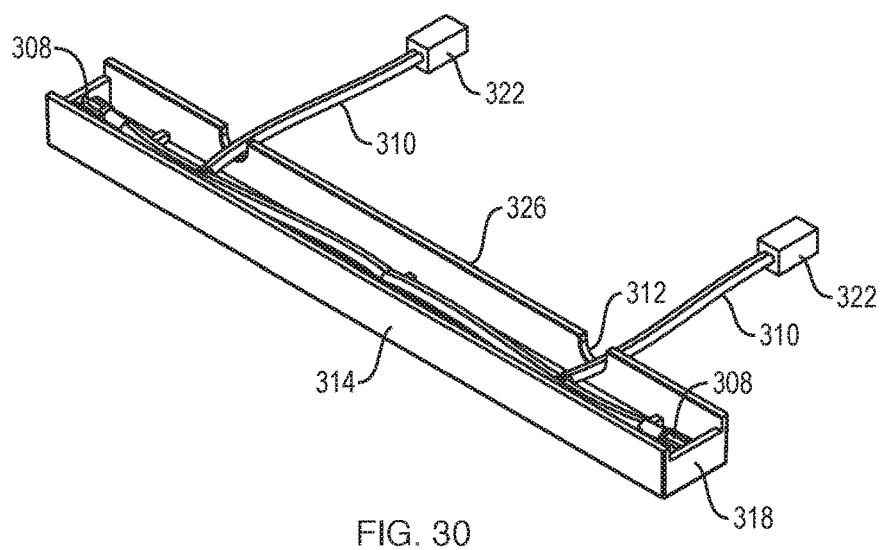
FIG. 30 depicts a bottom perspective view of an exemplary embodiment of an interior to a top cap assembly of a wall assembly.

FIG. 30 depicts a bottom perspective view of an exemplary embodiment of an interior of an assembled top cap. The wiring harness 310 can be configured to the second connector 322, which can be coupled to a power supply. The wiring harness 310 can extend from the rear surface 326 through wire knockouts 312. Within the top cap 122 the wiring harness 310 can be disposed to extend the length of the inner cavity. The electrical connectors 308 can be detachably coupled to the mating connector 324 and can be disposed proximate to the side walls 318 of the top cap.

Figure 31:
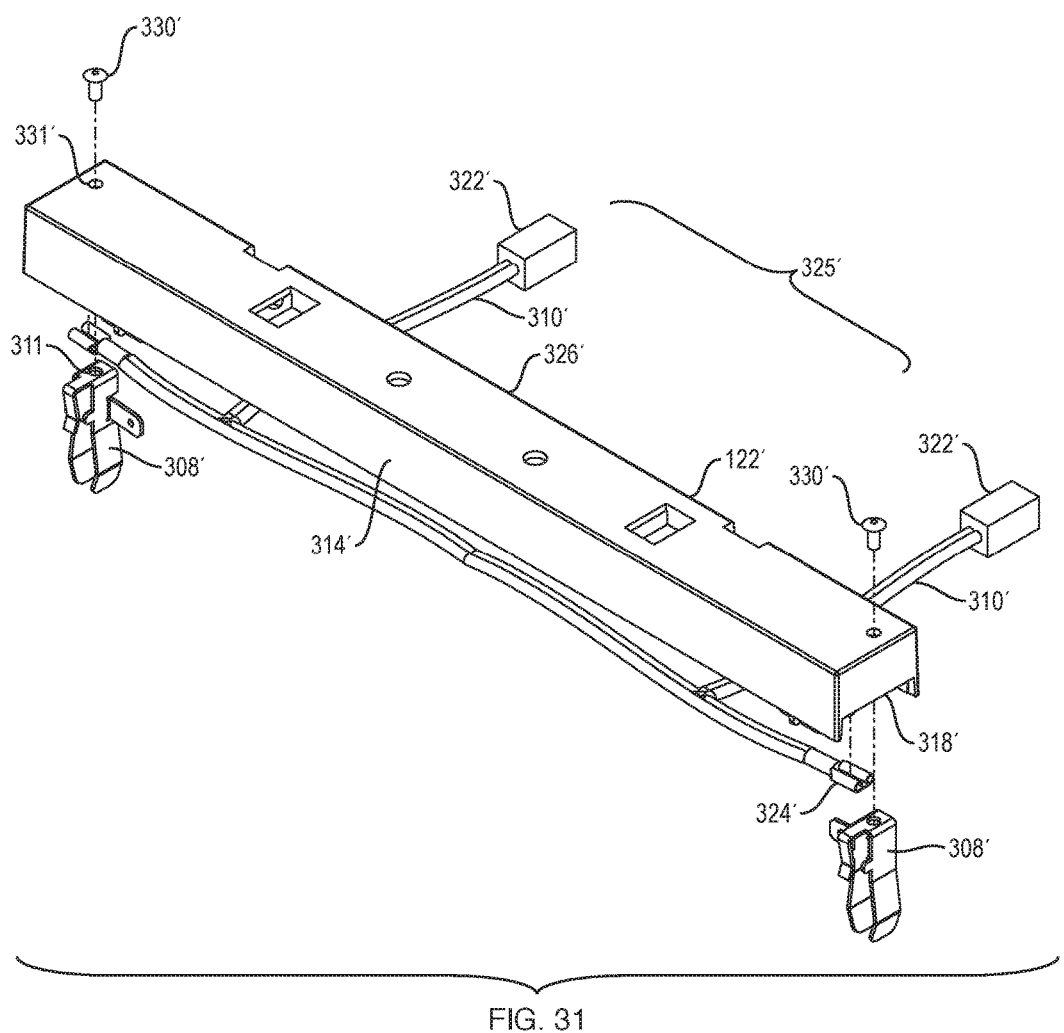
FIG. 31 depicts an exploded view of an exemplary embodiment of another top cap of a wall assembly.

FIG. 31 depicts an exploded view of an exemplary embodiment of the top cap 122' of the wall assembly. Referring to FIG. 31, the housing 325' of the top cap 122' can include a front surface 314', a top surface 326', a rear surface 328' and end walls 318'. In some embodiments, the front surface 314' of the top cap 122' can extend along the horizontal axis in a generally linear manner. The side walls 318' can extend between the front surface 314' and the rear surface 328'. The side walls 318' can extend from the top surface 326' downward, terminating before the bottom edge of the side wall becomes flush with the bottom edge of the front surface 314' and the rear surface 328'.

A wire assembly of the top cap 122' includes the wiring harness 310', or anywhere in between mating electrical connectors 324', electrical contacts 308' and external connectors 322'. The mating electrical connectors 324' can be disposed at terminal ends of the wiring harness 310' and can be detachably coupled to the electrical contacts 308'. The wire harness 310' can be operatively coupled to the housing 325' of the top cap 122' with fasteners 330', such as rivets, screws, bolts, or the like. For example, in some embodiments, the electrical contacts 308' can include a hole 311' that is configured to align with a hole 331' formed in the top surface 326' of the housing 325'. The fastener can be configured to extend through the top surface 326' and engage the hole 311' in the electrical contact 308' to secure the assembled wire harness 308' to the housing 325'. The electrical contacts 308' can be electrically coupled to mating connector 324' formed by a pair of resilient prongs. In some embodiments, the mating connector 324' can be configured to directly engage the power track insert portions of a vertical upright to secure the top cap 122' to the wall assembly and provide electrical power to the power track insert portions.

The external connectors 322' can be configured to electrically connect the top cap 122' to other top caps 122' and to a power supply (e.g., the power supply 126). In some embodiments, the top cap 122' can include two of the external connectors 322', where a first one of the external connectors can be connected to receive electricity from a component, such as a power supply or another top cap and a second one of the external connectors 322' can be configured to provide electricity flowing through the top cap to another component, such as another top cap 122'.

Figure 32:
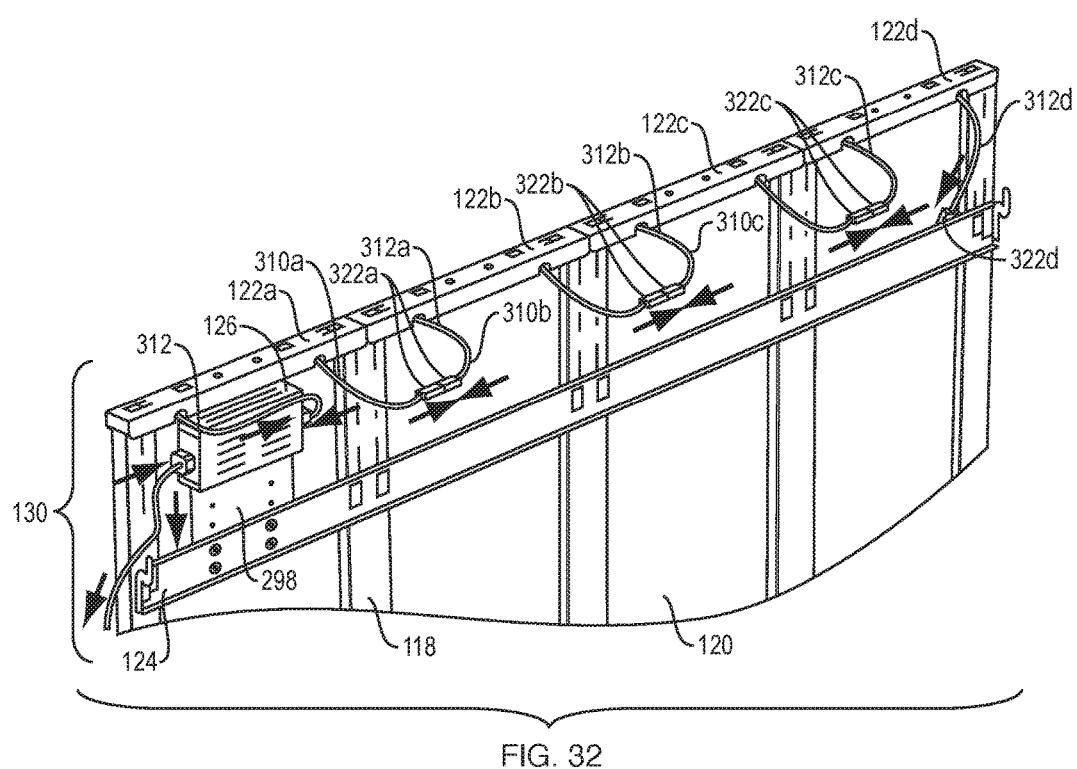
FIG. 32 depicts a rear perspective view of an exemplary embodiment of the wall assembly showing electrical connections between top caps of a wall assembly.

FIG. 32 depicts a rear perspective view of an exemplary embodiment of a portion of the wall assembly 130 showing electrical connections between the top caps 122a-d of the wall assembly. The vertical support structure 132 has been omitted from FIG. 32 to show a connection between other components of the wall assembly 130. As depicted in FIG. 32, the cross bar 124 can be configured to receive the vertical uprights 118 and the power supply bracket 298. The power supply 126 can be detachably coupled to the power supply bracket 298. A front panel 120 can be detachably coupled to the vertical uprights 118.

In an exemplary embodiment, the top caps 122a-d can be detachably coupled to the top of the vertical uprights 118. The wiring harnesses 310a-d can extend from the top caps 122a-d, through wire knockouts 312, toward the rear side of the merchandise display wall system 100. The wire harnesses 310a-d can be electrically coupled to the power supply 126 to receive power from the power supply 126 and to provide power to the vertical uprights 118. In some embodiments, the wiring harnesses 310a-d can be connected in series with each other. The wiring harnesses 310a-d can be detachably coupled to each other via the external connectors 322a-d. For example, detachably coupling several harnesses 310a-d via the external connectors 322a-d can provide power to the top caps 122a-d and vertical uprights 118 from a single power supply.

As depicted in FIG. 32, the power supply 126, top caps 122a-d, and vertical uprights 118 can be connected. As described below with reference to FIG. 33, shelf assemblies can be connected between adjacent vertical uprights 118 to complete the series circuit. To form the series circuit, an input to the power supply 126 can be received via an electrical outlet or terminal and an output of the power supply 126 can be connected to the top cap 122a via one of the external connectors 322a of the top cap 122a. The other one of the external connector 322a can form an output of the top cap 122b and can be connected to one of the external connectors 322b (e.g., an input) of the top cap 122b. The other one of the external connectors 322b can form an output of the top cap 122b and can be connected to one of the external connectors 322c (e.g., an input) of the top cap 122c. The other one of the external connectors 322c can form an output of the top cap 122c and can be connected to one of the external connectors 322d (e.g., an input) of the top cap 122d.

In some embodiments, each of the top caps 122a-d may be powered in parallel or a combination of series and parallel by a power supply 126. In some embodiments, the power supply 126 can be used to power a series of top caps 122a-d on a single merchandise display wall system 100 and/or can be used to power a series of top caps 122a-d on a plurality of different merchandise display wall systems 100. The power supply 126 can be positioned at the end of a cross bar 124 or can be positioned in the center of the cross bar 124.

Figure 33:
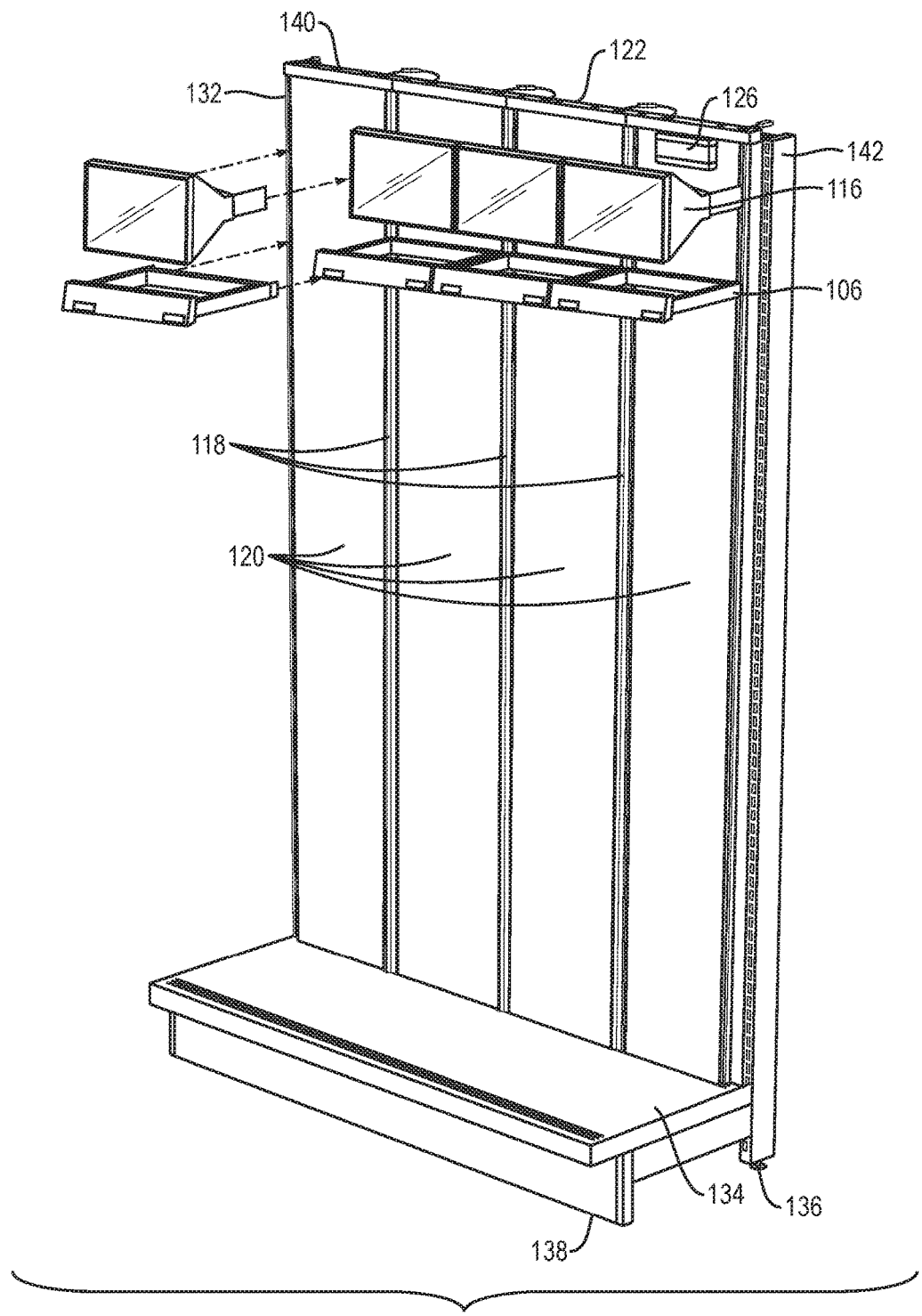
FIG. 33 depicts a front perspective view of an assembled wall assembly with shelf assemblies, or portions thereof, being attached to a wall assembly in accordance with exemplary embodiments of the present disclosure.

FIG. 33 depicts a front perspective view of an exemplary embodiment of an assembled wall assembly 130 with shelf assemblies 106 and light boxes 116 being attached thereto. In an example embodiment, circuitry including a light source included in one or more of the shelf assemblies 106 and light boxes 116 can be detachably coupled to the vertical upright 118 of the wall assembly 130. Electrical power can be provided from the power supply 126 through the top caps 122 to the vertical uprights 118 and to the shelf assemblies 106 and light boxes. Power flows from the power supply 126 through the first top cap 122 and then can be transmitted through the power insert track portions of the vertical uprights 118 to the shelf assembly 106. For example, in some embodiments, one of the top caps can connect to power track insert portions of adjacent vertical uprights, with a first one of the vertical uprights receiving the electricity from the top cap 122 and a second one of the vertical uprights 118 returning electricity to the top cap 122.

The shelf assemblies 106 and light boxes 116 can be electrically connected to power track insert portions in any of the vertical uprights 118 by electrically conductive arms when the shelf assemblies 106 and light boxes 116 are mounted to the wall assembly and can provide an electrical connection between the adjacent vertical uprights 118 to complete (or close) the circuit with the top cap 122. In some embodiments, when the shelf assemblies 106 and light boxes 116 are removed from the adjacent vertical uprights 118 the circuit can break (or open) the circuit such that the vertical upright that returns electricity to the top cap 122 is not energized while the vertical upright that receives electricity from the top cap 122 is energized to a voltage potential.

In some embodiments, the shelf assemblies 106 and/or the light boxes 116 can be adjustably spaced along the merchandise display wall system 100. For example, the shelf assemblies 106 can be attached to the merchandise display wall system 100 with a uniform spacing between the shelf assemblies 106 and/or can be attached to the merchandise display wall system 100 with different or variable spacing between the shelf assemblies 106.

Figure 34:
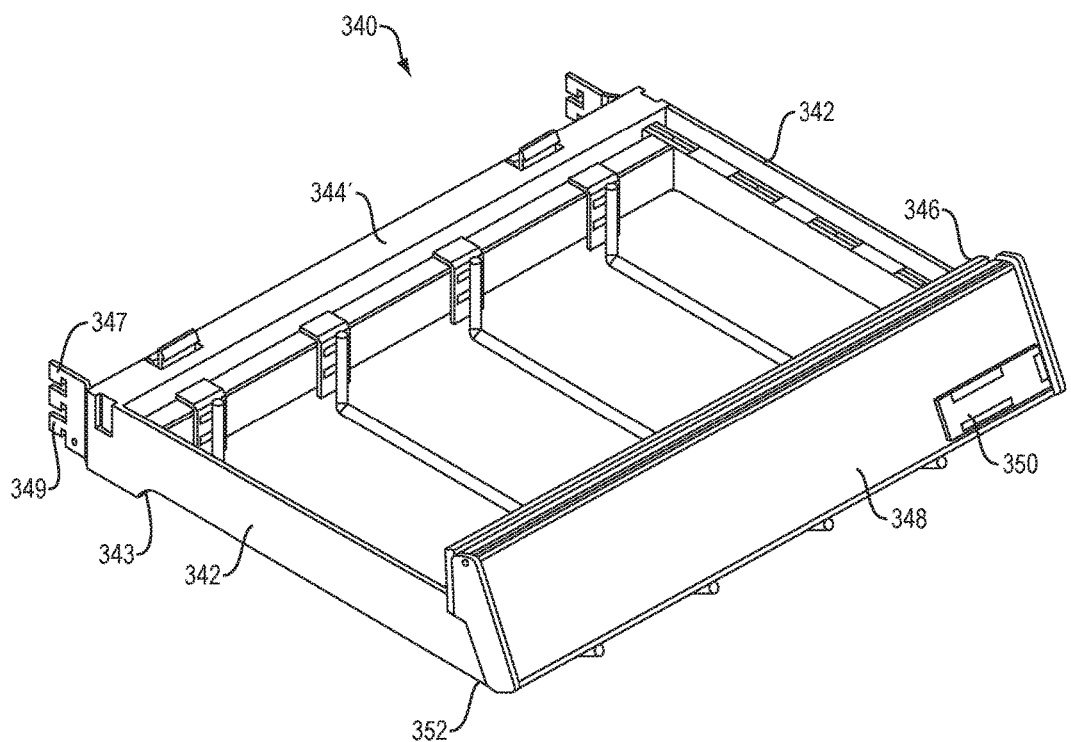
FIG. 34 depicts a front perspective view of an exemplary shelf assembly in accordance with exemplary embodiments of the present disclosure.

FIG. 34 depicts a front perspective view of a universal base frame that can be used to form the shelf assemblies depicted in FIGS. 1A and 1B (e.g., the brush display shelf assembly 104, the peg hook shelf assembly 108, the divider tray shelf assembly 110, the Bon Bon tray shelf assembly 112, and the trim tray shelf assembly 114). As shown in FIG. 34, the base frame 340 includes side walls 342 extending between a rear wall 344 and a front wall 346. In the present embodiment, the side walls 342 can be opposingly spaced and can extend parallel to each other. Likewise, the rear wall 344 and the front wall 346 can be opposingly spaced and can extend parallel to each other. The side walls 342 can generally extend perpendicularly from the rear wall 344 and the front wall 346 such that the base frame 340 has a rectangular configuration. The side walls 342, rear wall 344, and front wall 346 can define a perimeter of the base frame 340.

The electrically conductive arms 343 can be disposed within the side walls 342. A rear terminal end 347 of the electrically conductive arms can extend beyond the rear wall 344 of the base frame 340 and can include toothed fastening members 349 having generally serrated edges. The toothed fastening members 349 can be used to selectively attach the base frame 340 to the vertical uprights 118 of the wall system 100. In exemplary embodiments, the electrically conductive arms 343 can be formed of a metallic material. When the electrically conductive arms engage the wall assembly 120, electricity flows from the vertical uprights 118 through the electrically conductive arms and to the circuitry to energize the light source.

In the present embodiment, an informational display member 348 can be detachably coupled to the front wall 346 of the base frame 340. The informational display member 348 can receive display materials including display materials corresponding to product information, price information, store information, and/or any suitable information related to the one or more products to be supported and/or displayed by the assembled shelves.

Figure 35:
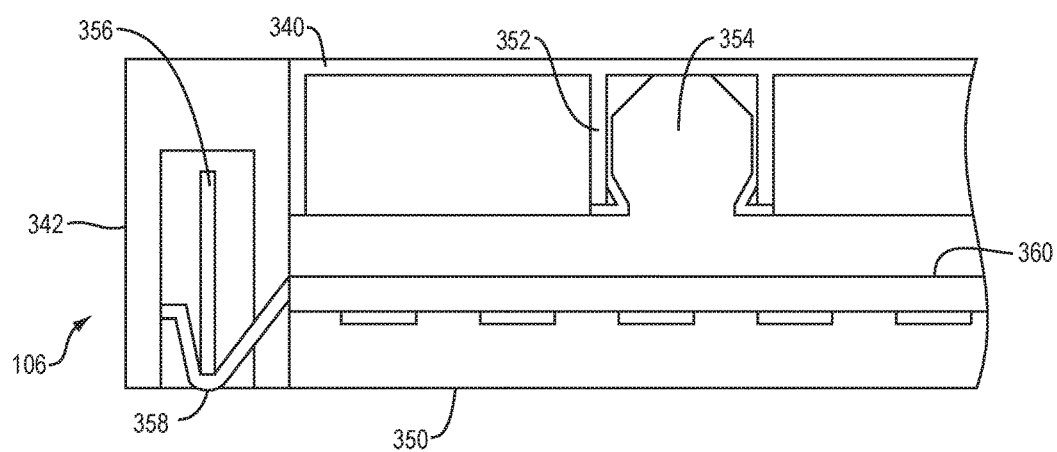
FIG. 35 depicts a cross-sectional view of an exemplary light source interfacing with a base frame that can be used to form a shelf assembly.

FIG. 35 illustrates a cross-sectional view of a portion of an exemplary embodiment of a shelf assembly 106 to depict a light source module 350. As depicted in FIG. 35, the light source module 216 can include a circuit board 360 having electronic circuitry and light emitting diodes (LEDs) 326. The light source module 350 can be selectively coupled to the base frame 340 with connector mating members 352 configured to receive the connector mating members 354 of the light source 350. The side wall 342 of the base frame 340 can include electrically conductive arms 356 that can be configured to the conductive mounting members 358 extending from the circuit board 360 of the light source 350. The light source module 350 can be selectively coupled to the base frame 340 with molded snaps 352 configured to receive the molded snap mating members 354 of the light source 350. The side wall 342 of the base frame 340 can include electrically conductive arms 356 that can be in electrical contact with the conductive mounting members 358 extending from the circuit board 360 of the light source 350. When the shelf assembly 106 is mounted to the vertical uprights of embodiments of the wall assembly, electricity can flow from a vertical upright into one of the electrical conductive arms 356 of the shelf assembly 106, through the circuit board 360 to energize the LEDs 326. After the electricity flows through the circuit board 360, the electricity can flow from the circuit board 360 to the other electrically conductive arm of the shelf assembly and to a return vertical upright.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A modular wall assembly configured to provide electrical power to a shelf assembly, the wall assembly comprising:
   a vertically oriented back panel;
   a cross bar horizontally and detachably mounted to the back panel;
   an electrically conductive insert;
   a vertical upright that forms an end assembly, the vertical upright detachably mounted to the cross bar and having an electrically non-conductive frame, the vertical upright including:
      a planar rear surface;
      a first arm extending from the planar rear surface;
      a second arm extending from the planar rear surface, the second arm being spaced away from the first arm and the planar rear surface, the first arm, and the second arm forming a first U-shaped channel;
      a pair of opposingly spaced U-shaped channels including a second U-shaped channel formed at an end of the first arm and a third U-shaped channel formed at an end of the second arm, the pair of opposingly spaced U-shaped channels open towards each other and are configured to receive the electrically conductive insert within the pair of U-shaped channels, such that the pair of opposingly spaced U-shaped channels retain the electrically conductive insert in parallel relation to the vertically oriented back panel;
      a first J-shaped channel distanced further away from the rear planar surface than the pair of opposingly spaced U-shaped channels, the first J-shaped channel extending continuously along a longitudinal side edge of the electrically non-conductive frame and configured to receive a front panel to cover at least a portion of the vertically oriented back panel; and
   a top cap disposed along an upper edge of the vertically oriented back panel and in electrical contact with the electrically conductive insert of the vertical upright.

2. The assembly of claim 1, wherein each end of the cross bar has a bracket and the back panel is configured to receive the bracket at each end of the cross bar to detachably couple the cross bar to the vertically oriented back panel.

3. The assembly of claim 1, wherein the cross bar includes a plurality of mating members disposed along a length of the cross bar and the vertical upright includes openings configured to receive the mating members to detachably couple the vertical upright to the crossbar.

4. The assembly of claim 1, further comprising a power supply mounted to the back panel, the power supply being electrically coupled to the top cap to provide electricity to the top cap.

5. The assembly of claim 1, wherein the pair of U-shaped channels is continuously open towards each other along a length of the electrically non-conductive frame.

6. The assembly of claim 1, wherein the vertical upright further includes a J-shaped second channel adjacent to the J-shaped first channel extending continuously along the longitudinal side edge of the electrically non-conductive frame.

7. A merchandise display system, comprising:
a wall assembly, the wall assembly including:
a vertically oriented back panel;
a cross bar horizontally and detachably mounted to the back panel;
an electrically conductive insert;
a vertical upright that forms an end assembly, the vertical upright detachably mounted to the cross bar and having an electrically non-conductive frame having:
a planar rear surface;
a first arm extending from the planar rear surface;
a second arm extending from the planar rear surface, the second arm being spaced away from the first arm and the planar rear surface, the first arm, and the second arm forming a first U-shaped channel;
a pair of opposingly spaced U-shaped channels including a second U-shaped channel formed at an end of the first arm and a third U-shaped channel formed at an end of the second arm, the pair of opposingly spaced U-shaped channels open towards each other and configured to receive the electrically conductive insert within the pair of U-shaped channels, such that the pair of opposingly spaced U-shaped channels retain the electrically conductive insert in parallel relation to the vertically oriented back panel;
a first J-shaped channel distanced further away from the rear planar surface than the pair of opposingly spaced U-shaped channels, the first J-shaped channel extending continuously along a longitudinal side edge of the electrically non-conductive frame and configured to receive a front panel to cover at least a portion of the vertically oriented back panel; and
a top cap disposed along an upper edge of the back panel and in electrical contact with the vertical upright to provide electricity to the vertical upright;
a shelf assembly, the shelf assembly including:
an area configured to hold merchandise for display;
first and second electrically conductive support arms extending from the shelf assembly, the shelf assembly being detachably mounted to the wall assembly via the first and second electrically conductive arms so that at least one of the first and second electrically conductive arms are in electrical contact with the vertical upright to receive electricity from the vertical upright; and
circuitry selectively engaging the first and second electrically conductive arms to energize a light source.

8. The system of claim 7, wherein each end of the cross bar has a bracket and the back panel is configured to receive the bracket at each end of the cross bar to detachably couple the cross bar to the vertically oriented back panel.

9. The system of claim 7, wherein the cross bar includes a plurality of mating members disposed along a length of the cross bar and the vertical upright includes openings configured to receive the mating members to detachably couple the vertical upright to the crossbar.

10. The system of claim 7, wherein the wall assembly further comprises a power supply mounted to the back panel, the power supply being electrically coupled to the top cap to provide electricity to the top cap.

11. The system of claim 7, wherein the wall assembly further comprises a recessed surface of the vertically oriented back panel, configured to be recessed with respect to a side edge element disposed along a vertical side edge of the vertically oriented back panel.

12. The system of claim 7, wherein the wall assembly further comprises a flush surface of the vertically oriented back panel, configured to be flush with respect to a side edge element disposed along a vertical side edge of the vertically oriented back panel.

13. The system of claim 7, wherein the cross bar includes a bracket extending outwardly from a recessed surface of the vertically oriented back panel, the bracket being configured to bridge a gap created by the recessed surface.

14. The system of claim 7, wherein the cross bar has a plurality of brackets configured to attach to a plurality of mounting geometries on the vertically oriented back panel.

15. The system of claim 7, wherein the pair of U-shaped channels is continuously open towards each other along a length of the electrically non-conductive frame.

16. The system of claim 7, wherein the electrically non-conductive frame further has a J-shaped second channel adjacent to the J-shaped first channel and extending continuously along the longitudinal side edge of the electrically non-conductive frame.

17. A method of configuring a reconfigurable merchandise display, comprising:
securing a cross bar to a vertically oriented back panel;
securing a vertical upright that forms an end assembly to the cross bar, the vertical upright having (i) an electrically non-conductive frame, (ii) a planar rear surface, (iii) a first arm extending from the planar rear surface, (iv) a second arm extending from the planar rear surface, the second arm being spaced away from the first arm and the planar rear surface, the first arm, and the second arm forming a first U-shaped channel, (v) a pair of opposingly spaced U-shaped channels including a second U-shaped channel formed at an end of the first arm and a third U-shaped channel formed at an end of the second arm, the pair of opposingly spaced U-shaped channels open towards each other and configured to receive an electrically conductive insert within the pair of U-shaped channels, such that the pair of opposingly spaced U-shaped channels retain the electrically conductive insert in parallel relation to the vertically oriented back panel, and (vi) a first J-shaped channel distanced further away from the rear planar surface than the pair of opposingly spaced U-shaped channels, the first J-shaped channel extending continuously along a longitudinal side edge of the electrically non-conductive frame and configured to receive a front panel to cover at least a portion of the vertically oriented back panel;
inserting the electrically conductive insert into the pair of U-shaped channels formed in the electrically non-conductive frame;
securing a top cap in electrical contact with the electrically conductive insert of the vertical upright;

securing a shelf assembly to the vertical upright, the shelf assembly including an area configured to hold merchandise for display, first and second electrically conductive support arms extending from the shelf assembly, and circuitry selectively engaging the electrically conductive arms; and electrically coupling a power supply mounted to the vertically oriented back panel to the top cap to provide electricity to the top cap, wherein electricity flows from the top cap through the vertical upright to the first or second electrically conductive arm to supply the electricity to the circuitry.

18. The method of claim 17, further comprising:

configuring the cross bar to include a plurality of cross brackets disposed along a front wall of the cross bar;

attaching an attachment member of the vertical upright to the cross brackets, wherein the cross brackets are configured to receive the attachment member to detachably couple the vertical upright to the cross bar.

19. The method of claim 17, wherein the reconfigurable merchandise display comprises a base frame, and the method comprises coupling a detachable object support structure having a plurality of settings for modular reconfiguration to the base frame.

20. The method of claim 17, wherein the reconfigurable merchandise display comprises a base frame, and wherein the circuitry is held in electrical contact with the electrically conductive arms via a friction fit between the circuitry and the base frame.

21. The method of claim 17, wherein the vertical upright further has a J-shaped second channel adjacent to the J-shaped first channel and extending continuously along the longitudinal side edge of the electrically non-conductive frame.

* * * * *